United States Patent
Nagata et al.

(10) Patent No.: US 11,210,052 B2
(45) Date of Patent: Dec. 28, 2021

(54) INFORMATION PROCESSING APPARATUS CONTROLLING SCREEN TO BE DISPLAYED

(71) Applicants: Tadashi Nagata, Kanagawa (JP); Kohichi Hirai, Kanagawa (JP)

(72) Inventors: Tadashi Nagata, Kanagawa (JP); Kohichi Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 368 days.

(21) Appl. No.: 15/318,424

(22) PCT Filed: Jun. 12, 2015

(86) PCT No.: PCT/JP2015/067672
§ 371 (c)(1),
(2) Date: Dec. 13, 2016

(87) PCT Pub. No.: WO2015/198972
PCT Pub. Date: Dec. 30, 2015

(65) Prior Publication Data
US 2017/0139658 A1 May 18, 2017

(30) Foreign Application Priority Data
Jun. 25, 2014 (JP) .............................. JP2014-130066

(51) Int. Cl.
| | |
|---|---|
| *G06F 3/147* | (2006.01) |
| *G03G 15/00* | (2006.01) |
| *H04N 1/00* | (2006.01) |
| *B41J 29/393* | (2006.01) |
| *G06F 3/0484* | (2013.01) |
| *G06F 1/3206* | (2019.01) |
| *G06F 9/451* | (2018.01) |

(Continued)

(52) U.S. Cl.
CPC ............ *G06F 3/147* (2013.01); *B41J 29/393* (2013.01); *G03G 15/5016* (2013.01);
(Continued)

(58) Field of Classification Search
CPC .. H04N 1/00; H04N 1/00411; H04N 1/00474; H04N 1/00923;
(Continued)

(56) References Cited

U.S. PATENT DOCUMENTS

2009/0128844 A1  5/2009 Kondo et al.
2010/0085592 A1*  4/2010 Lee .................... G03G 15/5004
                                                                         358/1.14

(Continued)

FOREIGN PATENT DOCUMENTS

EP      1445940      8/2004
EP      2725425      4/2014

(Continued)

OTHER PUBLICATIONS

Extended European Search Report for 15811418.1 dated Jun. 21, 2017.

(Continued)

*Primary Examiner* — Tan H Tran
(74) *Attorney, Agent, or Firm* — IPUSA, PLLC

(57) ABSTRACT

An information processing apparatus includes an event detection unit detecting at least one event; a registration unit registering corresponding information in which the event, which is detected by the event detection unit, is associated with a program; and a display unit displaying a screen, which is generated by the program, in accordance with the event, which is detected by the event detection unit, based on the corresponding information which is registered in the registration unit.

14 Claims, 24 Drawing Sheets

(51) Int. Cl.
*G06F 1/3234* (2019.01)
*G03G 21/00* (2006.01)
*G06F 3/0481* (2013.01)
*G06F 3/0482* (2013.01)

(52) U.S. Cl.
CPC .......... *G03G 21/00* (2013.01); *G06F 1/3206* (2013.01); *G06F 1/3284* (2013.01); *G06F 3/04817* (2013.01); *G06F 3/04847* (2013.01); *G06F 9/451* (2018.02); *H04N 1/00* (2013.01); *H04N 1/00411* (2013.01); *H04N 1/00474* (2013.01); *H04N 1/00923* (2013.01); *G06F 3/0482* (2013.01); *H04N 2201/0094* (2013.01); *Y02D 10/00* (2018.01)

(58) Field of Classification Search
CPC .......... H04N 2201/0094; Y02D 10/159; G06F 1/3206; G06F 1/3284; G06F 3/0482; G06F 3/04847; G06F 3/147; G06F 9/451; B41J 29/393; B41J 29/38; B41J 29/42
See application file for complete search history.

(56) References Cited

U.S. PATENT DOCUMENTS

| | | | |
|---|---|---|---|
| 2011/0029888 A1* | 2/2011 | Tsujimoto | H04N 1/00222 715/743 |
| 2011/0128575 A1* | 6/2011 | Iwata | H04N 1/00416 358/1.15 |
| 2011/0299116 A1* | 12/2011 | Hibino | G06F 3/1254 358/1.15 |
| 2012/0260350 A1* | 10/2012 | Yamada | H04N 1/00411 726/28 |
| 2013/0036319 A1 | 2/2013 | Tanaka | |
| 2013/0074008 A1* | 3/2013 | Umezawa | G03G 15/502 715/810 |
| 2014/0089487 A1 | 3/2014 | Debate | |
| 2015/0317758 A1* | 11/2015 | Auger | G06Q 50/2053 705/327 |
| 2017/0094121 A1* | 3/2017 | Mizuno | G06F 21/45 |

FOREIGN PATENT DOCUMENTS

| | | |
|---|---|---|
| JP | 2008-090727 | 4/2008 |
| JP | 2010-028716 | 2/2010 |
| JP | 2010-098653 | 4/2010 |
| JP | 2011-040878 | 2/2011 |
| JP | 2011-151806 | 8/2011 |
| JP | 2013-197763 | 9/2013 |

OTHER PUBLICATIONS

International Search Report dated Sep. 29, 2015 in PCT/JP2015/067672 filed on Jun. 12, 2015.
Office Action dated Aug. 22, 2018 issued with respect to the corresponding Chinese Patent Application No. 201580033244.2.

* cited by examiner

FIG.6A

| | EVENT | WHETHER TO START-UP PRIORITY APPLICATION YES: START-UP NO: NOT TO START-UP |
|---|---|---|
| 1 | POWER START-UP | YES OR NO |
| 2 | ENERGY-SAVING RESTORATION | YES OR NO |
| 3 | LOG IN | YES OR NO |
| 4 | SYSTEM AUTO RESET | YES OR NO |
| 5 | HOME KEY PRESS-DOWN | YES OR NO |

EXAMPLE SETTING 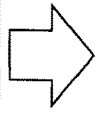

| | EVENT | WHETHER TO START-UP PRIORITY APPLICATION YES: START-UP NO: NOT TO START-UP |
|---|---|---|
| 1 | POWER START-UP | YES |
| 2 | ENERGY-SAVING RESTORATION | YES |
| 3 | LOG IN | YES |
| 4 | SYSTEM AUTO RESET | YES |
| 5 | HOME KEY PRESS-DOWN | NO |

FIG.6B

| | EVENT TO START-UP PRIORITY APPLICATION |
|---|---|
| 1 | POWER START-UP |
| 2 | ENERGY-SAVING RESTORATION |
| 3 | LOG IN |
| 4 | SYSTEM AUTO RESET |

FIG.7A

| LOG-IN USER | PRIORITY APPLICATION START-UP USER ? YES: A PRIORITY APPLICATION START-UP USER NO: NOT A PRIORITY APPLICATION START-UP USER |
|---|---|
| GENERAL USER | YES OR NO |
| GUEST USER | YES OR NO |
| MANAGER | YES OR NO |

FIG.7B

| | USER INFORMATION |
|---|---|
| USER NAME | MR. ICHIRO TOSHIMITSU |
| PASSWORD | **** |
| ATTRIBUTE | GENERAL USER |
| DEPARTMENT | ABC DEPARTMENT |
| GENDER | MALE |

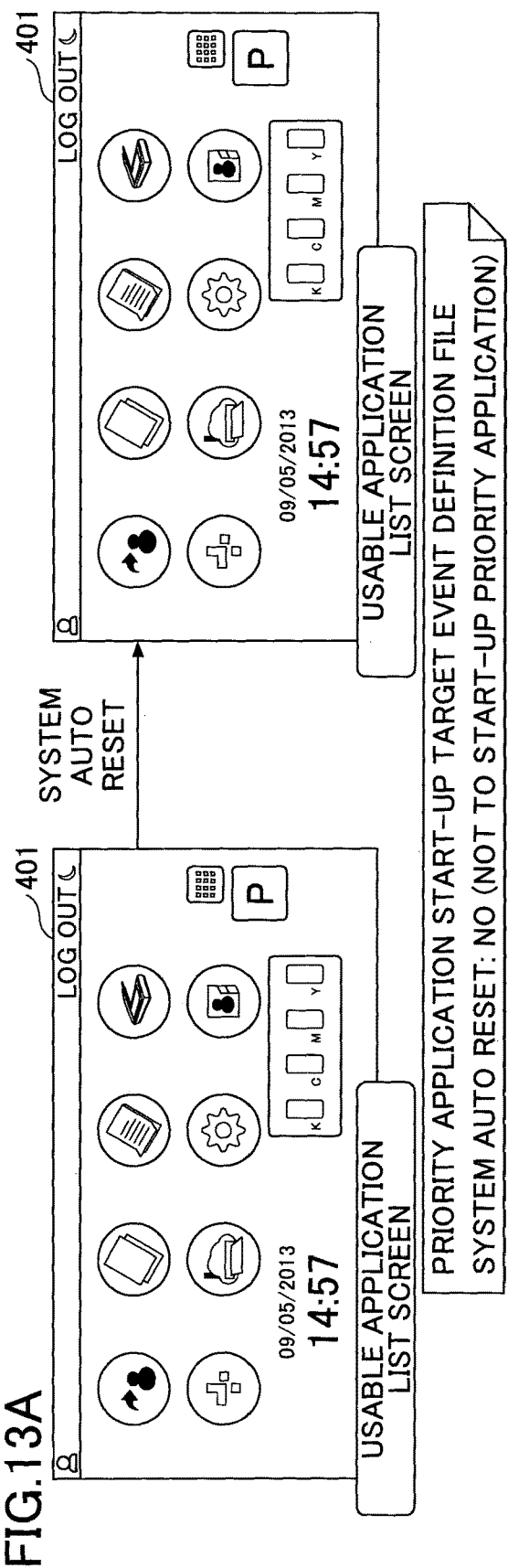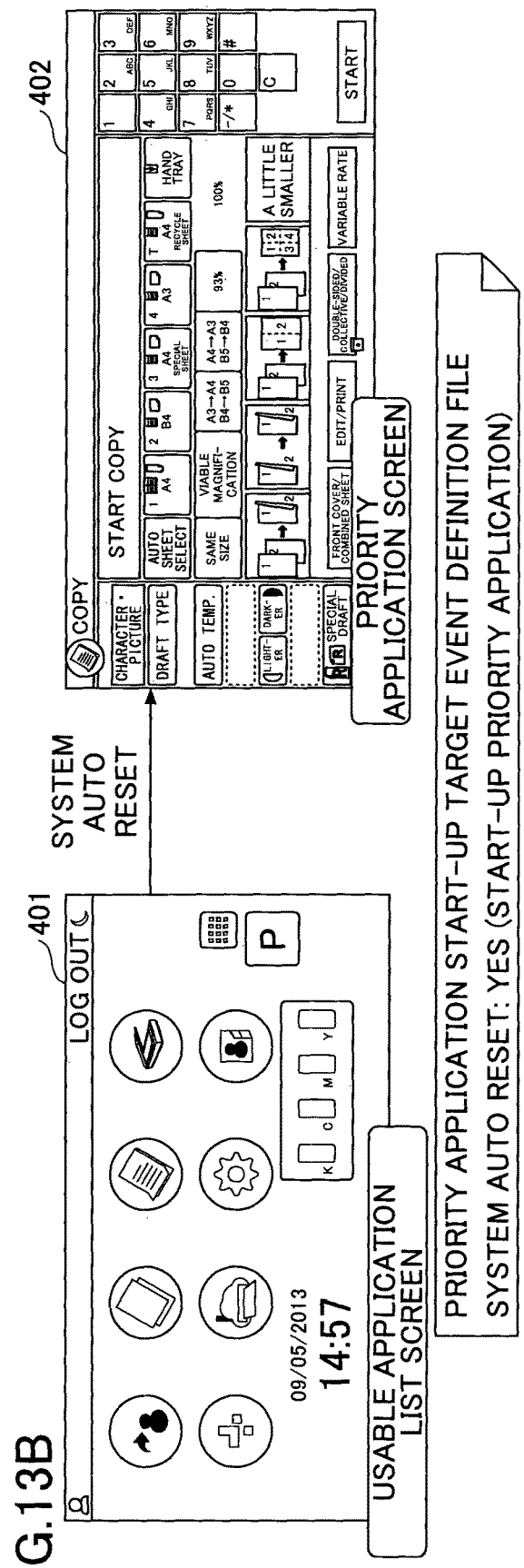

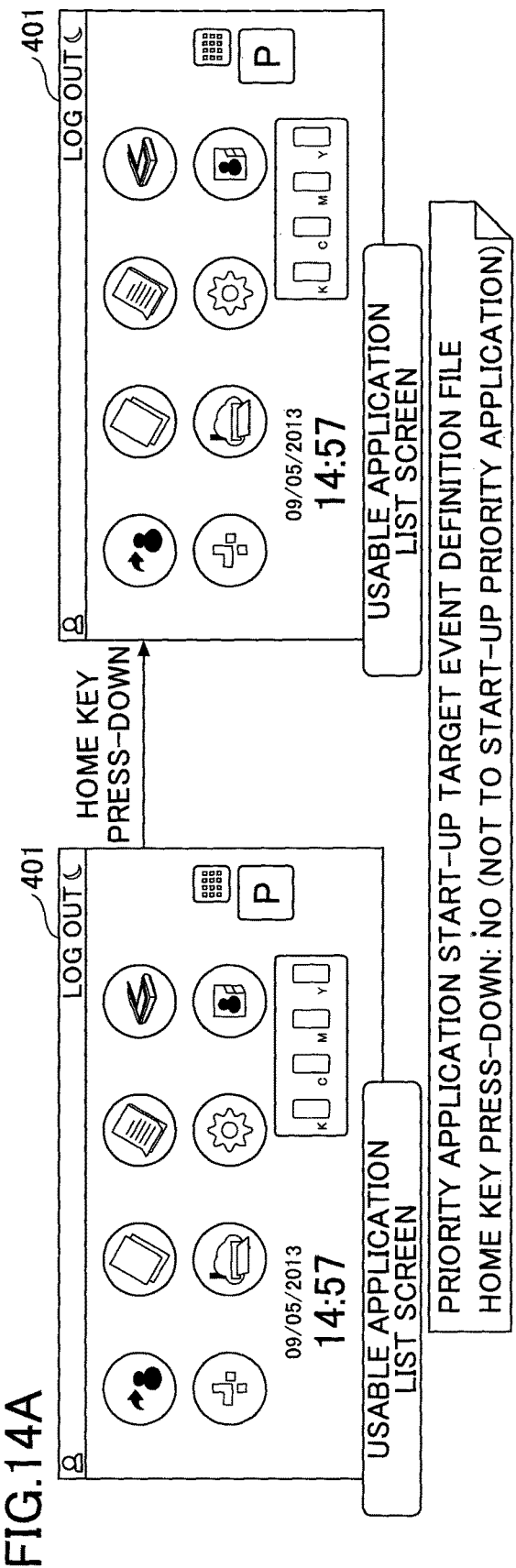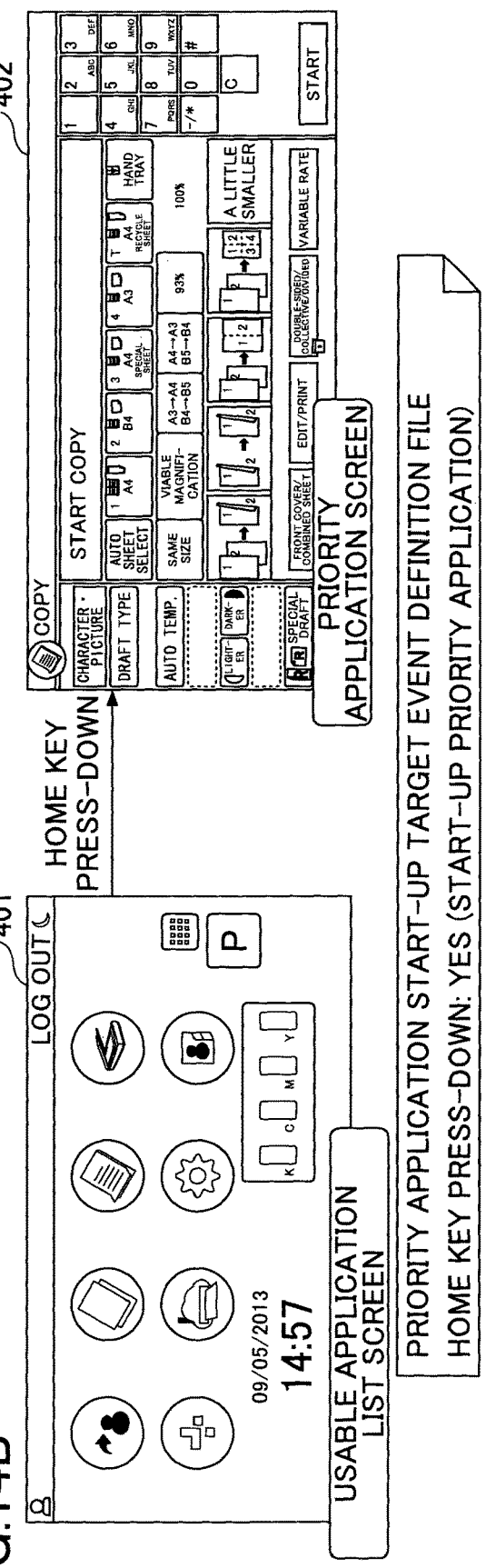

INFORMATION PROCESSING APPARATUS CONTROLLING SCREEN TO BE DISPLAYED

TECHNICAL FIELD

The present invention relates to an information processing apparatus, etc., to control a screen displayed on a display means.

BACKGROUND ART

There is a known apparatus that provides a user interface (UI) with a user by displaying an operation target and information on a display. When the apparatus provides only one function, as the UI, it is sufficient for the apparatus to display an initial screen (i.e., the screen displayed first after starting up) of an application corresponding to the only one function. However, with enhancement of the functions of the apparatus, one apparatus has become able to have plural functions, and accordingly, a user can select plural functions via the UI of the apparatus.

In order to lower the inconvenience to select a desired function from plural functions by a user, there is a known technique in which the original screen, which is to be provided for a user after starting up, is set as the initial screen in a specific application (see, for example, Patent Document 1).

SUMMARY OF THE INVENTION

Problems to be Solved by the Invention

However, in the technique of Patent Document 1, it is not possible to display a screen of a program depending on an event. Namely, the apparatus has various events other than starting up. However, the screen that can be easily used by a user after an event may vary. However, according to related-art technologies, it is not possible to display a screen of a program in accordance with an event.

The present invention is made in light of the above problem, and may provide an information processing apparatus that can display a screen of a program depending on an event.

Means for Solving the Problems

According to an aspect of the present invention, an information processing apparatus includes an event detection unit detecting at least one event; a registration unit registering corresponding information in which the event, which is detected by the event detection unit, is associated with a program; and a display unit displaying a screen, which is generated by the program, in accordance with the event, which is detected by the event detection unit, based on the corresponding information which is registered in the registration unit.

Effects Of The Present Invention

According to an aspect of the present invention, it becomes possible to provide an information processing apparatus that can display a screen of a program in accordance on an event.

BRIEF DESCRIPTION OF THE DRAWINGS

FIGS. 6A and 6B are drawings schematically illustrating a priority application start target event definition file;

FIGS. 7A and 7B are other drawings schematically illustrating the priority application start target event definition file;

FIG. 12 is a drawing illustrating an example transition of screens when the authentication is ON;

FIGS. 13A and 13B are drawings illustrating example transitions from a usable application list screen;

FIGS. 14A and 14B are other drawings illustrating example transitions from the usable application list screen;

FIG. 21 is a drawing illustrating an example procedure of the information processing terminal when a user logs in;

BEST MODE FOR CARRYING OUT THE INVENTION

In the following, embodiments of the present invention are described with reference to the accompanying drawings.

Figure 1A:
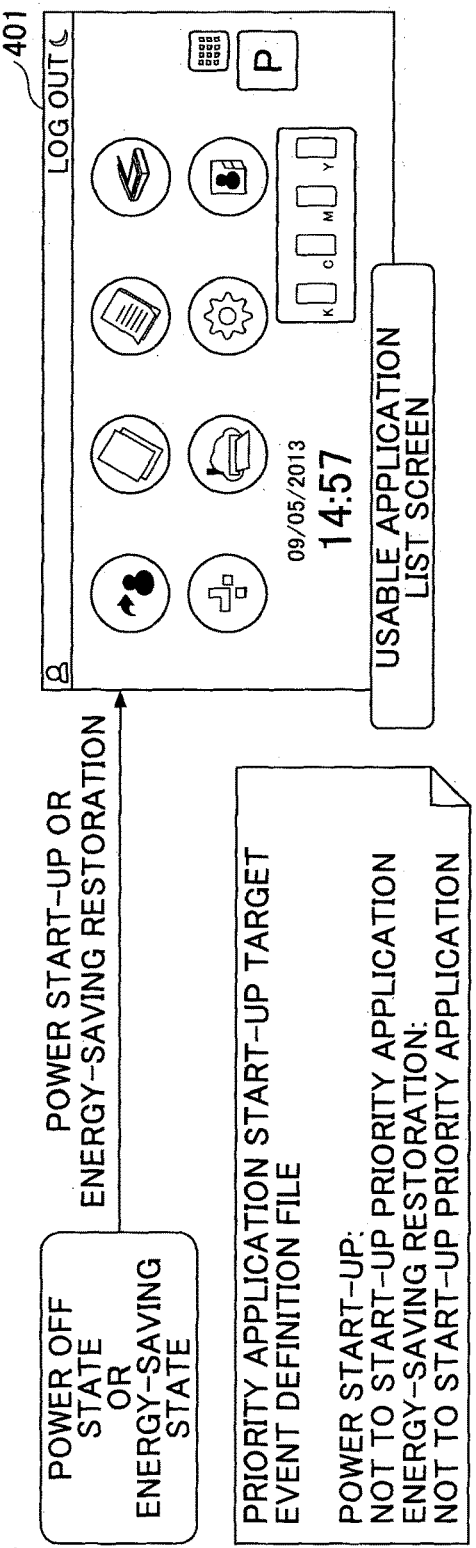
FIGS. 1A and 1B are drawings illustrating an example transition of a screen displayed by an apparatus according to an embodiment.
Figure 1B:
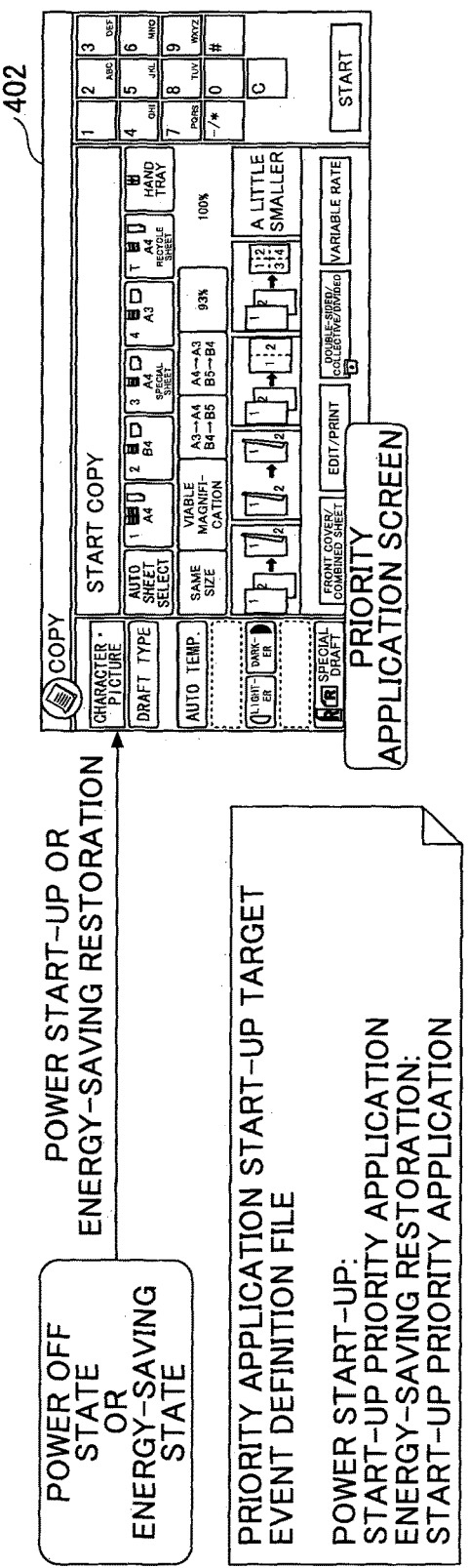

FIGS. 1A and 1B illustrate an example of transition of the screens displayed by an apparatus according to an embodiment. First, terms used herein are briefly defined as follows.

A term "screen" refers to a user interface which is displayed on a display.

A term "priority application" refers to an application which is started up with higher priority than any other applications, and is set by a user.

The "priority application" is an example of the claimed "program".

A term "priority application screen" refers to an initial screen (the screen which is displayed first after starting up) of the priority application. The "priority application screen" is an example of the claimed "first screen".

A term "usable application list screen" refers to a list screen of applications including the priority application, and may be called a "home screen". The "usable application list screen" is an example of the claimed "second screen".

A term "priority application start-up target event definition file" refers to a file which associates an event with the priority application.

The term "event" refers to an event that occurs in an apparatus.

An apparatus according to this embodiment stores the priority application start-up target event definition file that is previously set. The priority application start-up target event definition file (e.g., corresponding information), includes a setting whether to start up the priority application relative to the event.

With reference to FIGS. 1A and 1B, an event called "power start-up" or "energy-saving restoration" is exemplarily described by referring to a power off state or an energy saving state as a starting point. Nothing is displayed on a screen in the power off state or the energy saving state, and nothing is displayed or, for example, a screen saver is displayed on the screen in the energy saving state. Here, the term "energy saving state" refers to a state in which all the functions except for a function to wait for user operation are set OFF, so that energy consumption in the "energy saving state" is less than that in a state where an apparatus operates.

FIG. 1A illustrates a screen transition in a setting where the priority application is not started up relative to the event "power start-up" or "energy-saving restoration" in the priority application start-up target event definition file.

When the priority application start-up target event definition file relative to the event "power start-up" or "energy-saving restoration" is referred to, it is not set so that the priority application is started up. Therefore, the apparatus displays a usable application list screen 401.

FIG. 1B illustrates a screen transition in a setting where the priority application is started up relative to the event "power start-up" or "energy-saving restoration" in the priority application start-up target event definition file.

When the priority application start-up target event definition file relative to the event "power start-up" or "energy-saving restoration" is referred to, it is set so that the priority application is started up. Therefore, the apparatus displays a priority application screen 402.

Accordingly, it becomes possible for the apparatus to change the screen to be displayed relative to the event "power start-up" or "energy-saving restoration" depending on the setting content of the priority application start-up target event definition file.

Further, in FIGS. 1A and 1B, the event "power start-up" or "energy-saving restoration" is described as an example. However, note that a user can set whether to start up the priority application based on an event which is "log-in", "system auto reset", or "home key pressing down" in the priority application start-up target event definition file.

Therefore, when an event to display a screen occurs, it is possible for the apparatus according to this embodiment to display a list of the applications that can be used in accordance with the event or display an initial screen of a specific application with higher priority. As a result, it becomes possible to display a screen which is desired by a user based on how the user uses the apparatus.

For example, if a user wishes to minimize operation steps, it is possible to display the priority application screen 402 as a screen of the starting point when the user uses the apparatus. On the other hand, if a user wishes to employ an operation flow in consideration of security, it is possible to display the usable application list screen 401 which display a list of usable applications only.

Example Configuration

Figure 2A:
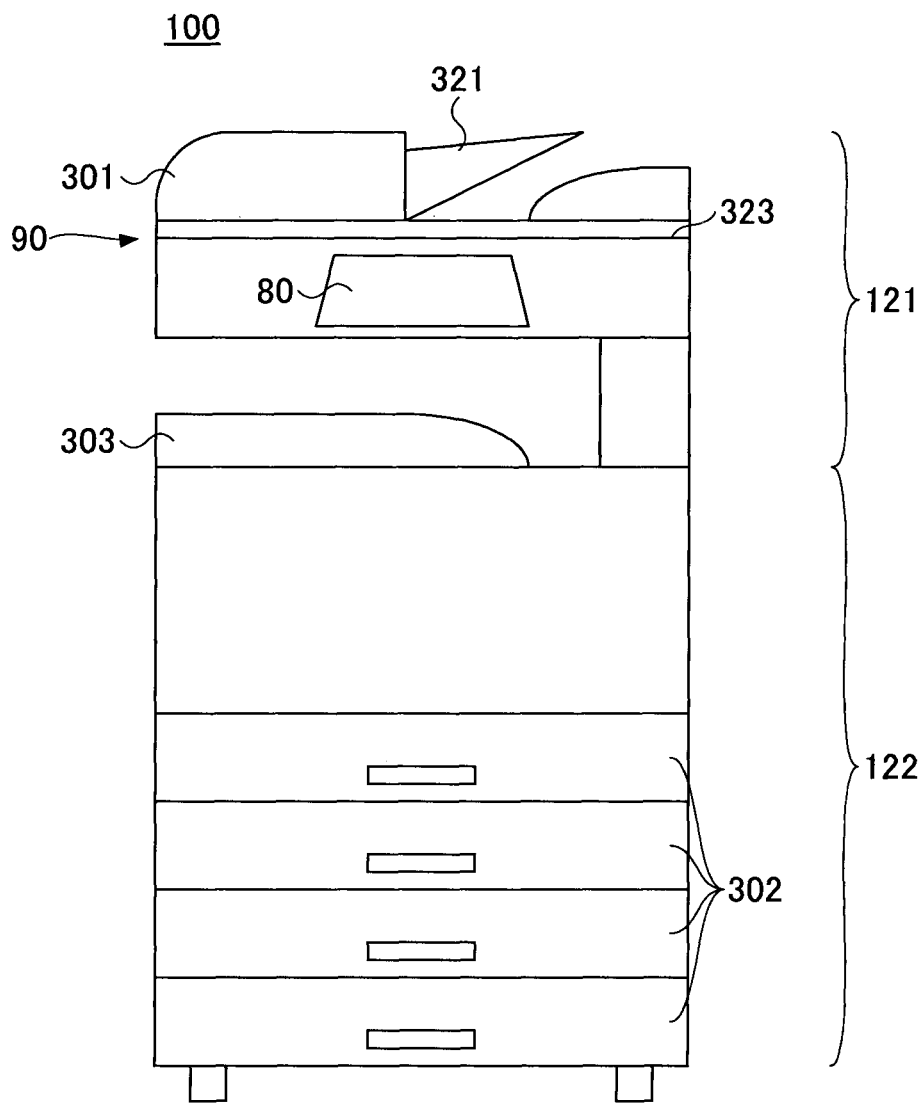
FIGS. 2A and 2B are drawings of an example external view of a MultiFuction Peripheral and a configuration of the MultiFuction Peripheral.

FIG. 2A is a view illustrating an example exterior of a MultiFuction Peripheral. The MultiFuction Peripheral 100 refers to an apparatus which has two or more functions including a printer, a FAX machine, a scanner apparatus, and a copier. However, the MultiFuction Peripheral 100 may have only a function of forming an image as a printer. The printer may be referred to as an "image forming apparatus". Further, in addition to those functions, the MultiFuction Peripheral 100 may further include, for example, an interface function with a document box and Cloud services.

Further, note that the MultiFuction Peripheral 100 is just an example of the apparatus on which an information processing terminal 80 is mounted. The information processing terminal 80 can be mounted on not only the Multi-Fuction Peripheral 100 but also a computer, which executes a program, and an apparatus which is called an "information processing apparatus". For example, in place of the MultiFuction Peripheral 100, a projector, a video conference system, a digital camera or the like may be used.

The MultiFuction Peripheral 100 mainly includes an imaging section 121 and a print section 122. In the imaging section 121, the information processing terminal 80 is disposed. Note that the position where the processing terminal 80 is disposed is not limited to the position as illustrated in the figure.

A draft, which is placed on a draft set section 321 of an Automatic Document Feeder (ADF) 301, is fed on a contact glass 323, and an image on the draft is imaged by the imaging section 121, so that image data are generated. In the print section 122, there are four sheet feed trays 302: A sheet, which is fed from the sheet feed trays 302 and on which the image data are formed, is discharged to a sheet discharge section 303.

Figure 2B:
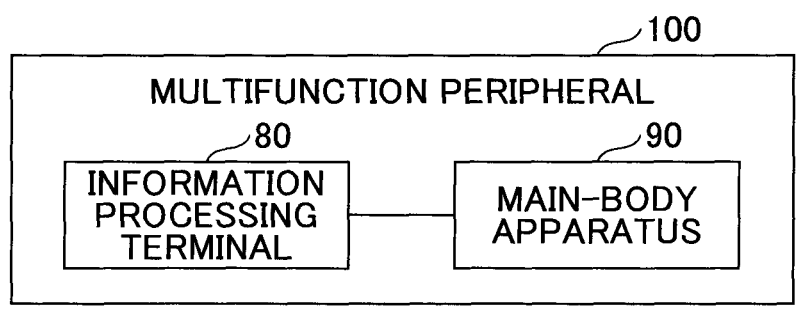

FIG. 2B is a view schematically illustrating an example configuration of the MultiFuction Peripheral 100. A main-body apparatus 90 is connected to the information processing terminal 80 so as to communicate with each other. The communication between the main-body apparatus 90 and the information processing terminal 80 is performed by using, for example, a Universal Serial Bus (USB), Near Field Communication (e.g., Bluetooth (registered trademark), infrared communication, etc.) or a network such as (wired or wireless) Local Area Network (LAN), etc.

The main-body apparatus 90 refers to an apparatus which provides at least the function of forming an image. On the other hand, the information processing terminal 80 displays a screen which serves as a user interface with a user.

The information processing terminal 80 is an electronic device that can perform a complete information process by itself such as a smartphone, a tablet terminal, etc., (and the information processing terminal 80 is an example of the claimed "information processing apparatus"). In this embodiment, the information processing terminal 80 functions as an operation section of the main-body apparatus 90. More specifically, the information processing terminal 80 is connected to the main-body apparatus 90 in place of an operation panel which is conventionally provided as an operation section dedicated to the MultiFuction Peripheral 100. The information processing terminal 80 and the main-body apparatus 90 may be recognized as a single apparatus.

Further, the information processing terminal 80 cannot be removed or may be removed from the MultiFuction Peripheral 100.

Figure 3:
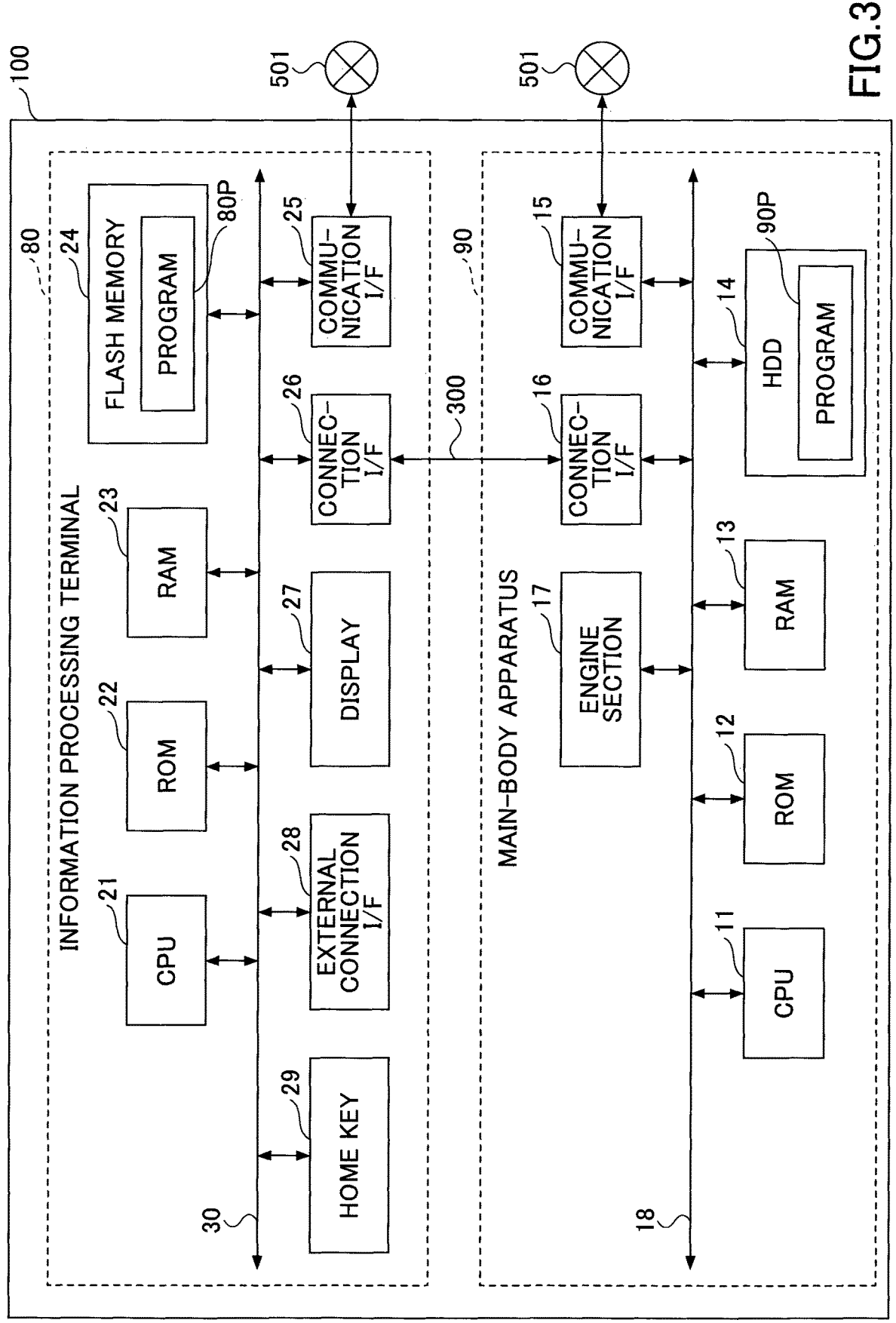
FIG. 3 is a drawing illustrating an example hardware configuration of the MultiFuction Peripheral.

Next, with reference to FIG. 3, a hardware configuration of the MultiFuction Peripheral 100 is described. FIG. 3 is a block diagram illustrating an example hardware configuration of the MultiFuction Peripheral 100. The main-body apparatus 90 and the information processing terminal 80 of the MultiFuction Peripheral 100 are connected with each other so as to communicate with each other via a communication path 300.

The main-body apparatus 90 can perform operations in accordance with the operations which are received by the information processing terminal 80. Further, the main-body apparatus 90 can communicate with an external apparatus such as a client Personal Computer (PC), etc., and perform an operation in accordance with an instruction received from the external apparatus.

First, the hardware configuration is described. The main-body apparatus 90 includes a Central Processing Unit (CPU) 11, a Read-Only Memory (ROM) 12, a Random Access Memory (RAM) 13, a Hard Disk Drive (HDD) 14, a communication interface (I/F) 15, a connection I/F 16, and an engine section 17, which are connected to each other via a system bus 18. The CPU 11 collectively controls the operations of the main-body apparatus 90. The CPU 11 controls the operations of the entire main-body apparatus 90 by executing a program 90$p$, which is stored in the ROM 12, the HDD 14 or the like, by using the RAM 13 as a work area (working area) and controlling the engine section 17. Further, various functions such as a copy function, a scanner function, a facsimile function, a printer function, etc., are realized.

The communication I/F 15 is an interface to connect to a network 501. The connection I/F 16 is an interface to communicate with the information processing terminal 80 via the communication path 300.

The engine section 17 is hardware that performs operations, which are to realize the copy function, the scanner function, the facsimile function, and the printer function, other than general-purpose information processing and a communicating process. The engine section 17 includes, for example, a scanner to read an image on a draft by scanning (image reading section), a plotter to print an image on sheet material such as the sheet (image forming section), a facsimile section to perform facsimile communication, etc. The engine section 17 may further includes specific options such as a finisher which divides printed sheet materials and an Automatic Document Feeder (ADF) which automatically feeds a draft.

Next, a hardware configuration of the information processing terminal 80 is described. The information processing terminal 80 includes a CPU 21, a ROM 22, a RAM 23, a flash memory 24, a communication I/F 25, a connection I/F 26, a display 27, an external I/F 28, and a home key 29, which are connected to each other via a system bus 30.

The CPU 21 collectively controls the operations of the information processing terminal 80. The CPU 21 controls the operations of the entire information processing terminal 80 by executing a program 806$p$, which is stored in the ROM 12, the flash memory 24 or the like, by using the RAM 13 as a work area (working area), and realizes various functions described below such as displaying information (image) in accordance with an input received from a user.

The communication I/F 25 is an interface to connect to the network 501. The connection I/F 26 is an interface to communicate with the main-body apparatus 90 via the communication path 300.

The display 27 receives various inputs in accordance with user's operations, and also displays various information (e.g., information in accordance with input operations, information indicating an operation state of the MultiFuction Peripheral 100, information indicating, for example, a setting state, etc.) as a screen. The display 27 is, but is not limited to, a Liquid Crystal Display (LCD) having a touch panel function. For example, the display 27 may be an organic electroluminescence (EL) display device having the touch panel function. Further, in addition to the display 27, the information processing terminal 80 may further include a hardware key, a lamp display, etc. For example, by having a button called the "home key 29" to display the usable application list screen 401 as the hardware key, it becomes possible for a user to display the usable application list screen 401 by pressing down the home key 29. Further, the home key 29 may be implemented as a software key to be displayed on a screen.

The external I/F 28 is an interface to communicate with an external device, and can be connected to, for example, an Integrated Circuit (IC) card reader/writer.

The home key 29 is a key for a user to input an event of pressing down the home key to the information processing terminal 80. The home key 29 is implemented as a hardware key as illustrated in FIG. 3 or may be implemented as a software key.

Figure 4:
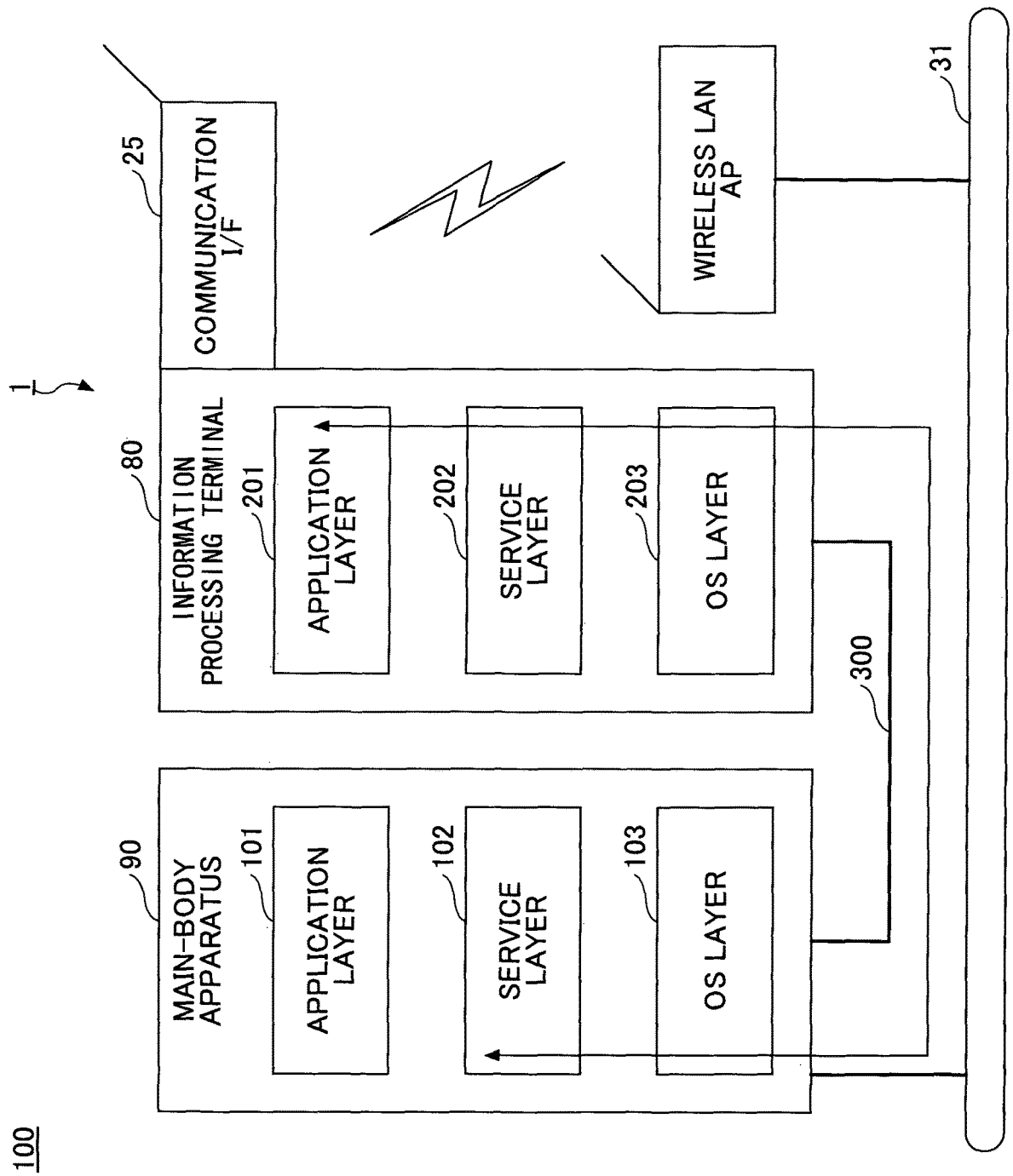
FIG. 4 is a drawing schematically illustrating an example software configuration of the MultiFuction Peripheral.

Next, with reference to FIG. 4, a software configuration of the MultiFuction Peripheral 100 is described. FIG. 4 schematically illustrates an example of the software configuration of the MultiFuction Peripheral 100. The main-body apparatus 90 includes an application layer 101, a service layer 102, and an OS layer 103. Entities of the application layer 101, the service layer 102, and the OS layer 103 are various software stored in the ROM 12, the HDD 14 or the like. By executing the software by the CPU 11, various functions are provided.

The software of the application layer 101 is application software which is for providing predetermined functions by operating hardware resources (hereinafter may be simplified as an "application(s)"). The applications include, for example, a copy application which provides the copy function, a scanner application which provides the scanner function, a facsimile application which provides the facsimile function, a printer application which provides the printer function, etc.

The software of the service layer 102 is software which lies between the application layer 101 and the OS layer 103, and which is for providing the application with an interface to use a hardware resource of the main-body apparatus 90. More specifically, the software of the service layer 102 is software which provides functions to receive an operation request to the hardware resource and perform adjustment on the operation request. As an example of the operation request, there is a request to read using the scanner and print using the plotter.

Further, an interface function provided by the service layer 102 is provided not only for the application layer 101 of the main-body apparatus 90 but also for an application layer 201 of the information processing terminal 80. Namely, the application of the application layer 201 of the main-body apparatus 90 can realize a function which uses the hardware resource (e.g., the engine section 17) of the main-body apparatus 90 via the interface function of the service layer 102.

The software of the OS layer 103 is a fundamental software (operating system) to provide a fundamental function to control the hardware of the main-body apparatus 90. The software of the service layer 102 converts a request, which is to use a hardware resource, from various applications into a command that can be interpreted by the OS layer 103, and transfers the command to the OS layer 103. Then, by executing the command by the software of the OS layer 103, the hardware resource performs an operation in accordance with the request from the application.

Similarly, the information processing terminal 80 includes the application layer 201, a service layer 202, and an OS layer 203. The hierarchical structure of the application layer 201, the service layer 202, and the OS layer 203 of the information processing terminal 80 is the same as that of the main-body apparatus 90. However, the functions which are provided by the applications of the application layer 201 and the types of the operation requests that can be received by the service layer 202 differ from those of the main-body apparatus 90. The application of the application layer 201 is the software which is for mainly providing a function of a user interface to perform operations of and display the functions of the main-body apparatus 90 (the copy function, the scanner function, the facsimile function, and the printer function). Further, the application of the application layer 201 may be software which is for providing a predetermined function by operating a hardware resource of the information processing terminal 80.

Further, in this embodiment, the software of the OS layer 103 of the main-body apparatus 90 differs from the software of the OS layer 203 of the information processing terminal 80. Namely, the main-body apparatus 90 and the information processing terminal 80 operate independently from each other base on the respective operating systems. For example, Linux (registered trademark) and Android (registered trademark) may be used as the software of the OS layer 103 of the main-body apparatus 90 and the software of the OS layer 203 of the information processing terminal 80, respectively. Further, the same OS may be used in the main-body apparatus 90 and the information processing terminal 80.

As described above, in the MultiFuction Peripheral 100 according to this embodiment, the main-body apparatus 90 and the information processing terminal 80 operate separately by using the respective operating systems. Therefore, the communications between the main-body apparatus 90 and the information processing terminal 80 are performed not as interprocess communications between common apparatuses but as communications between different apparatuses. For example, an operation to transfer the information (instruction content from a user) received by the information processing terminal 80 to the main-body apparatus 90 and an operation to report an event from the main-body apparatus 90 to the information processing terminal 80 correspond to the communications between different apparatuses. By performing a command communication to the information processing terminal 80 by the main-body apparatus 90, it becomes possible to use the function of the main-body apparatus 90. Further, the content of the information which is reported from the main-body apparatus 90 to the information processing terminal 80 includes an execution state of the operations in the main-body apparatus 90 and the content which is set by the main-body apparatus 90 side.

Further, power supply to the information processing terminal 80 is performed via the communication path 300 from the main-body apparatus 90. Therefore, it becomes possible to perform power control of the information processing terminal 80 separately (independently) from the power control of the main-body apparatus 90.

Figure 5:
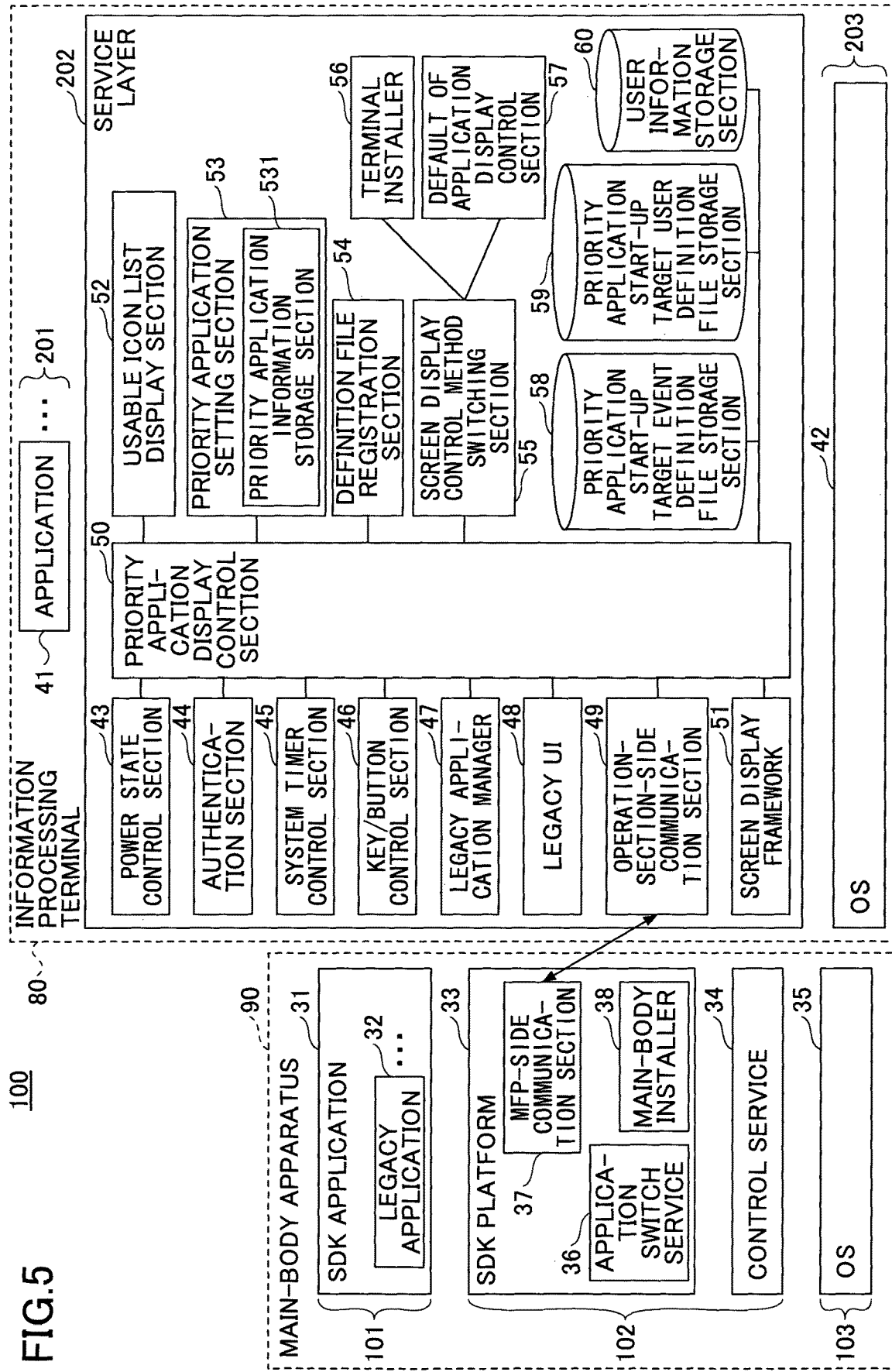
FIG. 5 is a block diagram of an example functional configuration of the MultiFuction Peripheral.

Next, with reference to FIG. 5, a functional configuration of the MultiFuction Peripheral 100 is described. FIG. 5 is a block diagram illustrating an example functional configuration of the MultiFuction Peripheral 100. For explanatory purposes, in FIG. 5, the functions related to this embodiment are mainly illustrated. However, note that the functions of the MultiFuction Peripheral 100 are not limited to the functions in FIG. 5.

The main-body apparatus 90 includes an Operating System (OS) 35, a control service 34, a Software Development Kit (SDK) platform 33, a legacy application 32, etc. The legacy application 32 is an example of an apparatus program.

The OS 35 is an OS which structures the OS layer 103. The software on the main-body apparatus 90 operates as a process or a thread on the OS 35.

The control service 34 is the software which structures the service layer 102. The control service 34 is a group of software modules which includes a function to control various hardware resources, and provides an interface so that an upper application, etc., can use the function.

The control service 34 includes, for example, a function related to network communication, function to control a scanner, a function to control a printer, a function to manage memories (the RAM 13, the ROM 12, the HDD 14, etc.), etc.

The SDK platform 33 includes an Application Programming Interface (API) which is for developing an SDK application 31, and provides an execution environment for the SDK application. A form of the API may be a function, an instance of an object-oriented program, a method of a class, etc.

Further, the SDK platform 33 may include a Java (registered trademark) Virtual Machine (VM). In this case, the SDK application 31 is implemented using Java (registered trademark) language.

In FIG. 5 the legacy application 32 is installed in the main-body apparatus 90 as the SDK application 31. However, note that a program that can be installed in the main-body apparatus 90 is not limited to the SDK application 31.

In FIG. 5, the SDK platform 33 includes an application switch service 36, a MultiFunction Peripheral (MFP)-side communication section 37, a main-body installer 38, etc.

The application switch service 36 starts up the legacy application 32. Further, the application switch service 36 transfers a change request to change a display state of a display part from the SDK application 31 to the control service 34. As a result, the display state of the display part is changed by the control service 34 on the operation panel (when available). In this embodiment, a conventional operation panel is replaced by the display 27 of the information processing terminal 80. Therefore, the control service 34 does not control the screen of the display 27.

The application switch service 36 performs a process of reflecting the change of the display state, which is in accordance with the request for display control to an operation panel which is not mounted, in the information processing terminal 80. For example, the application switch service 36 transfers the change request to change the display state of the display part from the SDK application 31 to the information processing terminal 80 via the MFP-side communication section 37. As a result, it becomes possible to cause the display control performed by the SDK application 31 to cooperate or synchronize with the display control performed by an application 41 in the information processing terminal 80.

Here, the term "display part" refers to various parts which can be component elements in a screen. For example, the display part is displayed to cause the main-body apparatus 90 to execute a process (job). As examples of the display part, there are a button, a software key, a soft keyboard, a window, a label to display a character string, etc.

The MFP-side communication section 37 controls the communications with the information processing terminal 80. The MFP-side communication section 37 communicates with the information processing terminal 80 by using Hyper-Text Transfer Protocol (HTTP). However, note that the communication protocol used between the main-body apparatus 90 and the information processing terminal 80 may not be limited to HTTP.

The main-body installer 38 installs various applications including the legacy application 32 in the main-body apparatus 90. The legacy application 32, which is installed by the main-body installer 38, is registered in the application switch service 36 and is reported to the information processing terminal 80.

The SDK application 31 is an application program (which is also called a "plug-in") which is additionally installed to expand the functions of the main-body apparatus 90 after shipment of the main-body apparatus 90. In FIG. 5, the legacy application 32 is exemplarily illustrated as the SDK application 31. The legacy application 32 sends a request to display a screen to the application switch service 36, and performs a predetermined process in accordance with an input relative to the screen. Here, the term "legacy" of the legacy application 32 is added (used) for convenience purposes as an expression relative to the application 41 which operates on the information processing terminal 80, and is not the term which is intended to limit the functions and the purposes of the legacy application 32.

The above-described functions of the sections (the application switch service 36, the MFP-side communication section 37, and the main-body installer 38) of the main-body apparatus 90 are realized by executing the program 91p, which is stored in the HDD 14, the RAM 13, or the ROM 12, by the CPU 11. However, the configuration is not limited to this, and, for example, at least one of the functions may be realized by a dedicated hardware circuit (e.g., by a semiconductor integrated circuit, etc.).

On the other hand, the information processing terminal 80 includes the application 41 in the application layer 201. In the figure, only one application 41 is illustrated. However, two or more applications 41 may be included. The application 41 or the legacy application 32 can be selected as the priority application.

Further, the information processing terminal 80 includes a priority application display control section 50 in the service layer 202. The priority application display control section 50 calls a power state control section 43, an authentication section 44, a system timer control section 45, a key/button control section 46, a legacy application manager 47, a legacy UI 48, an operation-section-side communication section 49, a screen display framework 51, a usable icon list display section 52, a priority application setting section 53, a definition file registration section 54, and a screen display control method switching section 55, and controls the transition of the screens. The term "call" includes, for example, calling a function, using an instance of an object-oriented program, and executing a method by the priority application display control section 50, etc.

The layout of the functions of the information processing terminal 80 are for explanatory purposes and schematically illustrated. Note that the layout of the functions is not limited to the layout in the figure. Further, in FIG. 5, the functions belong to the service layer 202. However, note that this does not exclude the configuration where the functions belong to the OS layer 203 or the application layer 201, and may be appropriately disposed in an appropriate layer.

The power state control section 43 first detects an ON/OFF state of main power of the main-body apparatus 90 and a state that a mode of the main-body apparatus 90 is transitioned to an energy-saving mode or is restored from the energy-saving mode. Namely, the main-body apparatus 90 acquires the information indicating the ON/OFF state of the main power and the transition to/restoration from the energy-saving mode from the MFP-side communication section 37 via the communication path 300, and reports the information to the priority application display control section 50. Further, the power state control section 43 and the authentication section 44, the system timer control section 45, and the key/button control section 46, which are described below, are examples of the claimed event detection unit.

Further, in a case where the mode of the information processing terminal 80 is transitioned to the energy-saving mode independently from the main-body apparatus 90, for example, the power state control section 43 may detect that the mode of the information processing terminal 80 is transitioned to or restored from the energy-saving mode.

The authentication section 44 displays a log-in screen based on an instruction from the priority application display control section 50, and determines whether authentication of the user is successful. Whether authentication of the user is successful is determined based on whether a pair of a password and a user name, which are the same as a pair of password and a user name stored in a user information storage section 60 in advance, is input. Further, an IC card may be used for log-in. In this case, the authentication section 44 determines whether the identification information, etc., which is read from the IC card by using an IC card reader/writer connected to the information processing terminal 80, is already registered.

When determining that the authentication is successful, it becomes possible to acquire the information of the log-in user (log-in user information) from the user information storage section 60. The user information storage section 60 stores user information per users.

Further, the authentication section 44 detects that a user logs out. The authentication section 44 detects log-out when a user presses a log-out button. Further, in a case where log-in is performed by using an IC card reader/writer, the authentication section 44 detects log-out not only when a user presses a log-out button but also when the IC card reader/writer no longer detects the IC card.

The authentication section 44 notifies the priority application display control section 50 whether log-in is successful, and further notifies the priority application display control section 50 that a user logs out. Further, the authentication section 44 may authenticate a user by requesting an external authentication server to perform the authentication.

The system timer control section 45 performs various timer controls (e.g., clear timer, counting, and detection of elapse of set timer) to control processes performed by the information processing terminal 80 using a timer as a trigger. In this embodiment, the system timer control section 45 controls a system auto reset timer. The term "system auto reset" refers to restoration to a state right after the system of the information processing terminal 80 starts up (i.e., a state right after a reset operation). When the system auto reset is done, a state of the screen is returned to an initial state as well. In this embodiment, which screen to be displayed by the system auto reset is set in the priority application start-up target event definition file.

Namely, the system timer control section 45 performs the system auto reset when a predetermined time period has passed since a user finally operates the MultiFuction Peripheral 100, and notifies the priority application display control section 50 that the system auto reset is performed.

The key/button control section 46 detects that the home key 29 is pressed down when the home key 29 is implemented as a hardware key. On the other hand, when the home key 29 is implemented as a software key, the key/button control section 46 displays the home key 29 as one of the display parts on the display 27, and detects that the home key 29 is pressed down. The key/button control section 46 notifies the priority application display control section 50 that the home key 29 is pressed down.

Further, in this embodiment, the key/button control section 46 displays the home key 29 and detects that the home key 29 is pressed down. However, note that the key/button control section 46 may further detect that any other key or button of the information processing terminal 80 is pressed down and control the display thereof.

The legacy application manager 47 manages information of the legacy application 32 installed in the main-body apparatus 90, and performs control causing the legacy application 32 to start up based on notification from the priority application display control section 50. As the information of the legacy application 32, there are, for example, the name, the icon, the version, the installation date and time of the legacy application 32.

The legacy UI 48 generates a screen of the legacy application 32 base on notification from the legacy application manager 47. In this embodiment, since there is no conventional operation panel, even when the legacy application of the main-body apparatus 90 starts up, the screen which is generated by the legacy application 32 will not be displayed. Therefore, by generating a screen of the legacy application 32 by the legacy UI 48, it becomes possible for the information processing terminal 80 to display the UI of the legacy application 32 on the display 27.

The operation-section-side communication section 49 communicates with the MFP-side communication section 37 of the MultiFuction Peripheral 100. By doing this, it becomes possible for the information processing terminal 80 to transmit, for example, a request to start up the legacy application 32 and the information of a hardware key and a software key which are pressed down to the main-body apparatus 90. In this embodiment, the information transmitted from the information processing terminal 80 is reported to the priority application display control section 50.

The screen display framework 51 is a framework which is in charge of displaying a screen on the display 27. In this embodiment, there are three functions based on the legacy UI 48, the usable icon list display section 52, and the application 41, that can generate a screen. Accordingly, the screen display framework 51 displays a screen, which corresponds to, for example, the last screen that is generated finally among the screens generated by the three functions, on the display 27. Further, the term "framework" refers to a class group in which a plurality of standard classes are gathered in a specific process. By using the framework, the development time can be reduced. Therefore, the entity of the screen display framework 51 is merely a program, so that a screen may be displayed without using the framework.

The usable icon list display section 52 generates a list screen (the usable application list screen 401) of icons to start up the application 41 and the legacy application 32 which are currently usable by the MultiFuction Peripheral 100. The application 41 and the legacy application 32 which are currently usable refer to the application 41 installed in the information processing terminal 80 and the legacy application 32 installed in the main-body apparatus 90, respectively. However, note that a user may only register any application 41 or the legacy application 32 in the usable application list screen 401. By doing this, it becomes possible to limit the application 41 or the legacy application 32 to be started up.

Further, the legacy application 32 installed in the main-body apparatus 90 is managed by the legacy application manager 47, and it is possible to acquire the application name and the icon of the application 41 installed in the information processing terminal 80 by sending an inquiry to an OS 42 of the information processing terminal 80.

The priority application setting section 53 receives a setting of the application 41 or the legacy application 32 to have priority from among the legacy application(s) 32 installed in the main-body apparatus 90 and the application(s) 41 installed in the information processing terminal 80. The selected application 41 or the legacy application 32 that is received by the priority application setting section 53 is a priority application. The priority application is stored in a priority application information storage section 531. A method of setting the priority application is described with reference to FIG. 8.

The definition file registration section 54 registers the priority application start-up target event definition file in a priority application start-up target event definition file storage section 58. Namely, the definition file registration section 54 displays events, which are described below with reference to FIGS. 6A and 6B, on the display 27, and receives settings whether to start up the priority application with respect to the events. The definition file registration section 54 is an example of the claimed registration unit.

Further, the definition file registration section 54 registers a priority application start-up target user definition file in a priority application start-up target user definition file storage section 59. Namely, the definition file registration section 54 displays log-in users, which are described below with reference to FIG. 7A, on the display 27, and receives settings whether each of the log-in users is a priority application start-up user.

The screen display control method switching section 55 switches from an application display control section 57 (in default setting) to the installed priority application display control section 50. Namely, before the priority application display control section 50 according to this embodiment is installed, a default of the application display control section 57 performs control displaying of the usable application list screen 401. The default of the application display control section 57 controls the log-in screen and the display of the usable application list screen 401 which-exist conventionally.

Therefore, when the priority application display control section 50 is installed, two or more similar functions are installed. This is why the screen display control method switching section 55 switches to the priority application display control section 50 when the priority application display control section 50 is installed. More detail is described with reference to FIG. 26.

A terminal installer 56 detects that a new application 41 is installed in the information processing terminal 80. In this embodiment, the terminal installer 56 detects that the priority application display control section 50 is installed, and reports the detection result to the screen display control method switching section 55.

Based on notification of an event, the priority application display control section 50 refers to the priority application start-up target event definition file, and switches to a display of the priority application screen 402 or the usable application list screen 401. The event is reported from the power state control section 43, the authentication section 44, the system timer control section 45, and the key/button control section 46. The content of the events is described below. The priority application display control section 50 is an example of the claimed display unit.

Further, in the MultiFuction Peripheral 100, it is possible for a manager, etc., to set so that the MultiFuction Peripheral 100 cannot be used without user's log-in (which is called "Authentication ON") or so that the MultiFuction Peripheral 100 can be used without user's log-in (which is called "Authentication OFF").

The priority application display control section 50 can acquire an attribute of the log-in user. In the case of Authentication ON, the priority application display control section 50 refers to the priority application start-up target user definition file and can switch to the display of the priority application screen 402 or the usable application list screen 401 in accordance with the attribute of the log-in user. The attribute of a user is described below.

Further, the priority application start-up target event definition file storage section 58 stores the priority application start-up target event definition file, and the priority application start-up target user definition file storage section 59 stores the priority application start-up target user definition file. Further, the user information storage section 60 stores the user information.

The above-described functions of the sections of the MultiFuction Peripheral 100 (the power state control section 43, the authentication section 44, the system timer control section 45, the key/button control section 46, the legacy application manager 47, the legacy UI 48, the operation-section-side communication section 49, the screen display framework 51, the usable icon list display section 52, the priority application setting section 53, the screen display control method switching section 55, the terminal installer 56 and the default of the application display control section 57) are realized by executing the program 80p stored in the ROM 22, the RAM 23, the flash memory 24, etc., by the CPU 21 of the information processing terminal 80. However, the configuration is not limited to this, and, for example, at least one of the functions may be realized by a dedicated hardware circuit (e.g., by a semiconductor integrated circuit, etc.). Further, the priority application start-up target event definition file storage section 58, the priority application start-up target user definition file storage section 59, and the user information storage section 60 are realized by, for example, the flash memory 24, etc., or may be realized by the HDD 14, etc., of the main-body apparatus 90.

Further, the programs 80p and 90p, which are executed by the main-body apparatus 90 or the information processing terminal 80, are provided by being recorded in a computer-readable recording medium in an installable format or an executable format file. The recording medium is, for example, a Compact Disk Read-Only Memory (CD-ROM), a Compact Disk-Recordable (CD-R), a Digital versatile Disk (DVD), a Universal Serial Bus (USB) memory, etc. Further, the programs 80p and 90p may be provided or distributed from a server (not shown) via a network such as the Internet, etc. Further, the programs 80p and 90p, which are executed by the main-body apparatus 90 or the information processing terminal 80, may be provided by being stored in advance in a non-volatile recording medium such as a ROM, etc. Priority application start-up target event definition file Next, the priority application start-up target event definition file is described with reference to FIGS. 6A and 6B. FIG. 6A schematically illustrates an example of the priority application start-up target event definition file. In the priority application start-up target event definition file, whether "priority application is started up" is set by "Yes" or "No" per each event.

In the figure, the types of the events are "Power start-up", "Restore to energy saving", "Log-in", "System auto reset", and "Home key press-down". However, note that those are examples only, and any other event than illustrated in the figure may be included.

When an event occurs to which "Yes" is set, the priority application display control section 50 displays the priority application on the display 27. When an event occurs to which "No" is set, priority application display control section 50 displays the usable application list screen 401 on the display 27. Accordingly, it becomes possible to control (determine) whether to display the initial screen of the application 41 or the legacy application 32 or display the usable application list screen 401 based on an event such as "Power start-up".

In the lower table in FIG. 6A, a setting example is illustrated. In the example, "No" is set to "Home key press-down" only, and "Yes" is set to the events other than "Home key press-down".

Further, the priority application start-up target event definition file can be operated by using a software key or a hardware key by a manager and can be set and modified from an operation panel on the display 27.

Further, the priority application start-up target event definition file may be set and modified from a PC, etc., via the network 501.

Part FIG. 6B illustrates another example of the priority application start-up target event definition file. In FIG. 6B, neither "Yes" nor "No" is set to any of the events, and only the events by which the priority application is started by are set in the priority application start-up target event definition file.

Therefore, when an event occurs which is set in the priority application start-up target event definition file, the priority application display control section 50 displays the priority application on the display 27. Note that there is no substantial difference between the priority application start-up target event definition files in FIGS. 6A and 6B. Therefore, in the following descriptions, the priority application start-up target event definition files in FIG. 6A is used. Priority application start-up target user definition file Next, the priority application start-up target user definition file is described with reference to FIG. 7A. FIG. 7A schematically illustrates an example of the priority application start-up target user definition file. In the priority application start-up target user definition file, "whether (the log-in user is the) priority application start-up user or not" is set by "Yes" or "No". Similar to the priority application start-up target event definition files in FIG. 6B, the priority application start-up target user definition file may register only the priority application start-up target user.

To a log-in user, the attribute of the log-in user is set. As the attribute of the log-in user includes a "general user", a "guest user", and a "manager" as illustrated in the figure. However, note that those are examples only. Any types of the log-in user other than those in the figure may be included. For example, the generation user may be an employee of a company where the MultiFuction Peripheral 100 is installed; the guest user may be a visitor guest who temporarily use the MultiFuction Peripheral 100; and the manager is person who manages the MultiFuction Peripheral 100.

When a log-in user to which "Yes" is set logs in, the priority application display control section 50 determines that the log-in user is a user by which the priority application is displayed on the display 27.

Therefore, the priority application display control section 50 operates as described below.

In the case of "Authentication ON", when the log-in user is the priority application start-up user, the priority application display control section 50 displays the priority application screen 402 or the usable application list screen 401 in accordance with the setting in an priority application start-up target application definition file.

In the case of "Authentication OFF", the priority application display control section 50 displays the priority application screen 402 or the usable application list screen 401 in accordance with the setting in the priority application start-up target application definition file without considering the attribute of the user.

In the case of "Authentication ON", for example, when a guest user uses the MultiFuction Peripheral 100, the use authority of the guest user is not clear and recommended functions are not clear as well. Therefore, it is possible to display the usable application list screen 401. On the other hand, when an employee uses the MultiFuction Peripheral 100, the use authority and the recommended functions are clear. Therefore, it is possible to display the priority application screen, so that each log-in user can perform his/her optimal operations.

Further, the priority application start-up target user definition file can be operated by using a software key or a hardware key by a manager and can be set and modified from an operation panel on the display 27.

Further, the priority application start-up target user definition file may be set and modified from a PC, etc., via the network 501.

Priority application start-up target user definition file (User information file)

Next, a user information file is described with reference to FIG. 7B. FIG. 7B schematically illustrates an example of the user information. The user information storage section 60 stores the user information of the users. The user information includes, but is not limited to, for example, a user name, a password, an attribute, a department (position), gender, etc.

When the priority application start-up target user definition file is referred to, the attribute among the user information is referred to. Further, in the priority application start-up target user definition file, it is possible to register whether the user is the priority application start-up target user not based on the attribute of the user but based on the user name, the department (position), gender, etc. For example, by registering whether user is the priority application start-up target user based on the user name, it becomes possible for the priority application display control section 50 to determine whether the priority application screen is to be displayed for each of the users.

Setting of Priority Application

Figure 8:
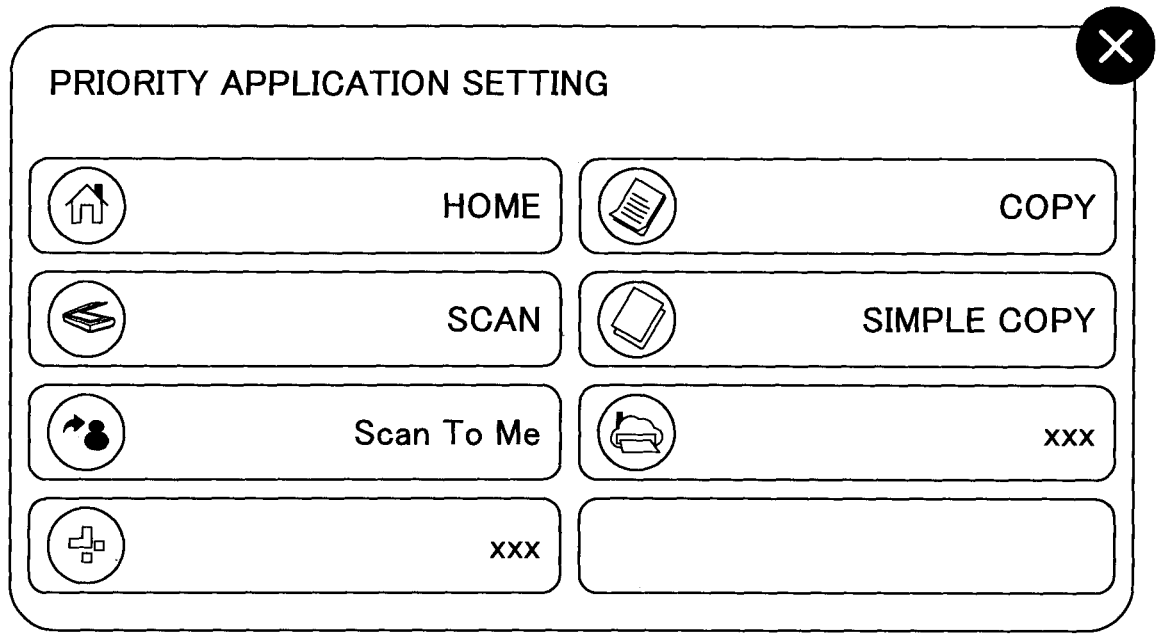
FIG. 8 is a drawing illustrating an example priority application setting screen which a priority application setting section displays on a display of an information processing terminal.

FIG. 8 illustrates an example priority application setting screen which is displayed on the display 27 of the information processing terminal 80. The priority application setting section 53 can acquire a list of the applications 41 installed in the information processing terminal 80 from the OS 42 by using the API provided by the OS 42. Further, as described above, a list of the legacy applications 32 can be acquired from the legacy application manager 47. Based on the above, it becomes possible to acquire the application name and the icon of the application 41 or the legacy application 32 installed in the information processing terminal 80 and the main-body apparatus 90.

Further, the application name and the icon may be acquired by reading a file, which is set by a manager, etc., by the priority application setting section 53.

The priority application setting section 53 displays, for example, the application name and the icon as a pair as illustrated in FIG. 8. When a user selects one application 41 or one legacy application 32, the priority application setting section 53 accepts the selected application 41 or legacy application 32 as the priority application, and stores the priority application in the priority application information storage section 531.

Further, the priority application information storage section 531 stores the information indicating whether the priority application is the legacy application 32 or the application 21. By doing this, it becomes possible for the priority application display control section 50 to determine whether the priority application is started up in the information processing terminal 80 or in the main-body apparatus 90.

Further, in a case where there is only one application 41 or legacy application 32 which is installed in the information processing terminal 80 and the main-body apparatus 90, it is not necessary to select the application by a user. In this case, the only one application 41 or legacy application 32 installed in the information processing terminal 80 and the main-body apparatus 90 may be set as the priority application.

Screen Display

Figure 9:
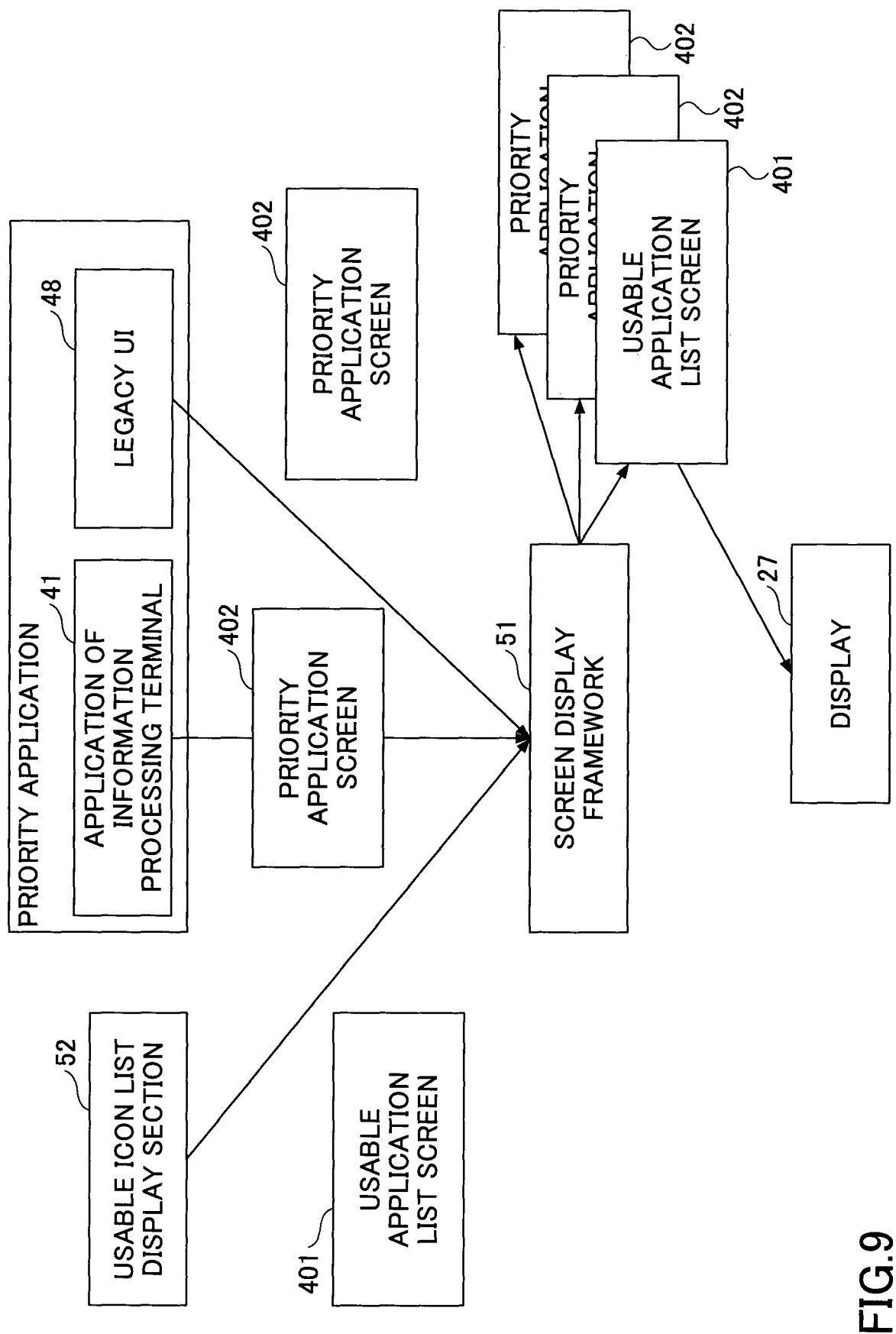
FIG. 9 is a drawing schematically illustrating an example operation of a screen display framework.

Next, with reference to FIG. 9, screens to be displayed on the display 27 are described. FIG. 9 schematically illustrates the operations of the screen display framework 51. The screen display framework 51 switches (selects) the usable application list screen 401, which is generated by the usable icon list display section 52, and the priority application screen 402, which is generated by the priority application, and displays the selected usable application list screen 401 or priority application screen 402.

Specifically, the screen display framework 51 stores the usable application list screen 401 and the priority application screen 402 as layers, and switches the screen to be displayed on the display 27 by switching the layers. For example, the screen display framework 51 basically displays the screen which is finally generated on the display 27, and switches the display to be displayed on the display 27 in accordance with a request from the priority application display control section 50.

Installation Procedure

Figure 10:
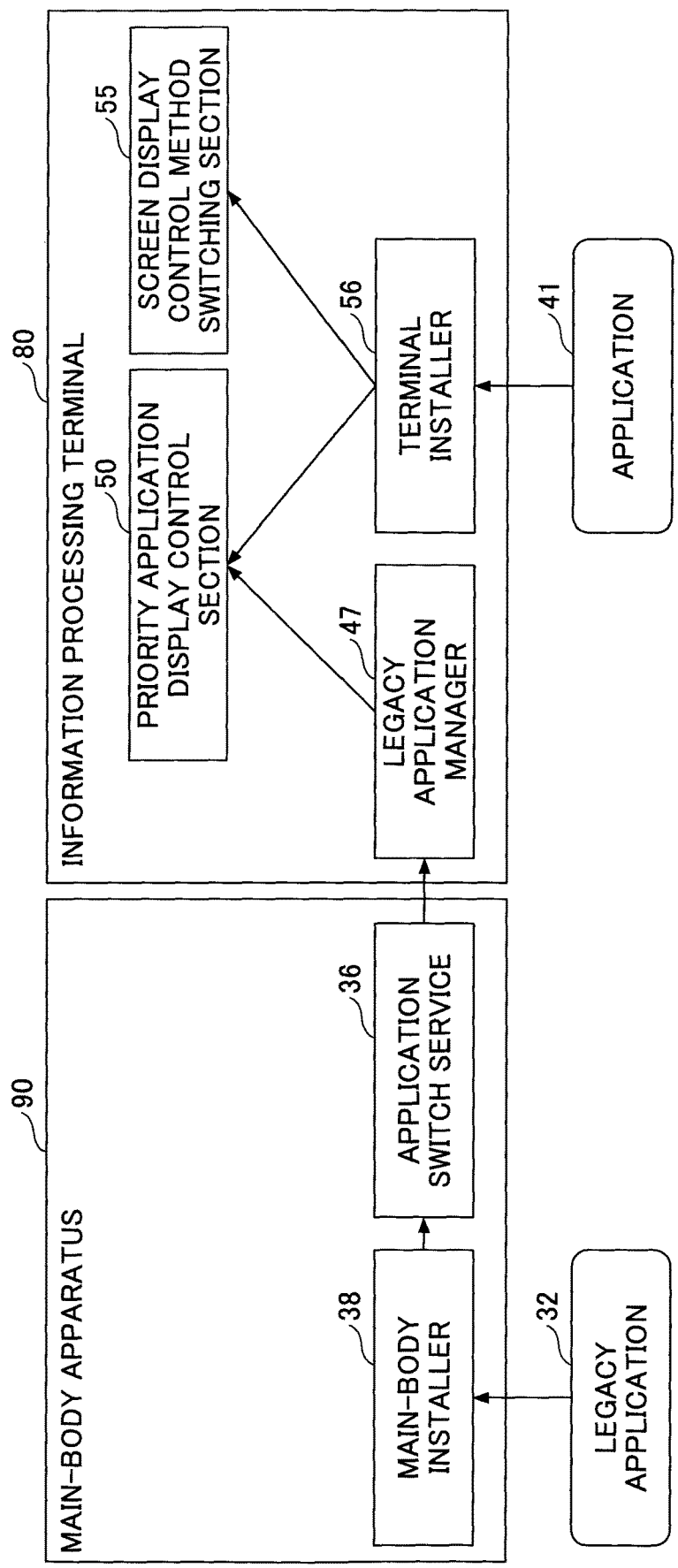
FIG. 10 is a drawing illustrating an example of an installation of a legacy application into a main-body apparatus or an installation of an application into the information processing terminal.

Next, with reference to FIG. 10, the installation of the application 41 or the legacy application 32 is described. FIG. 10 schematically illustrates an example of the installation of the legacy application 32 in the main-body apparatus 90 or the application 41 in the information processing terminal 80.

In this embodiment, there are a case where the legacy application 32 is installed in the main-body apparatus 90 and a case where the application 41 is installed in the information processing terminal 80. The installed legacy application 32 or the application 41 can be the priority application.

1. The main-body installer 38 of the main-body apparatus 90 installs the legacy application 32, which is stored in a recording medium or a server (not shown) by a manager's operation as a trigger, in the main-body apparatus 90. Further, the main-body installer 38 detects the installed legacy application 32, and reports the detection result to the application switch service 36. The application switch service 36 reports the information of the installed legacy application 32 to the legacy application manager 47. By doing this, it becomes possible for the information processing terminal 80 to store the names, the icons, the versions, and the installation date and time of the installed legacy applications in the main-body apparatus 90.

2. The terminal installer 56 of the information processing terminal 80 installs the application 41, which is stored in a recording medium or a server (not shown) by a manager's operation as a trigger, in the information processing terminal 80. The terminal installer 56 reports the information of the installed application 41 to the priority application display control section 50. Therefore, the priority application setting section 53 can accept the setting of the priority application.

Further, in a case where the application display control section 50 is installed as the application, the terminal installer 56 reports this matter to the screen display control method switching section 55. When the application display control section 50 is installed, a process, which differs from the process that is performed when any other application 41 is installed, is performed.

When the application display control section 50 is installed, basically, the installed application display control section 50 is operated as a new application display control section 50. On the other hand, in an exceptional case where a plurality of the application display control sections 50 are installed, the default of the application display control section 57 which is already installed operates. Details are described with reference to FIG. 26.

Screen Transition

Figure 11:
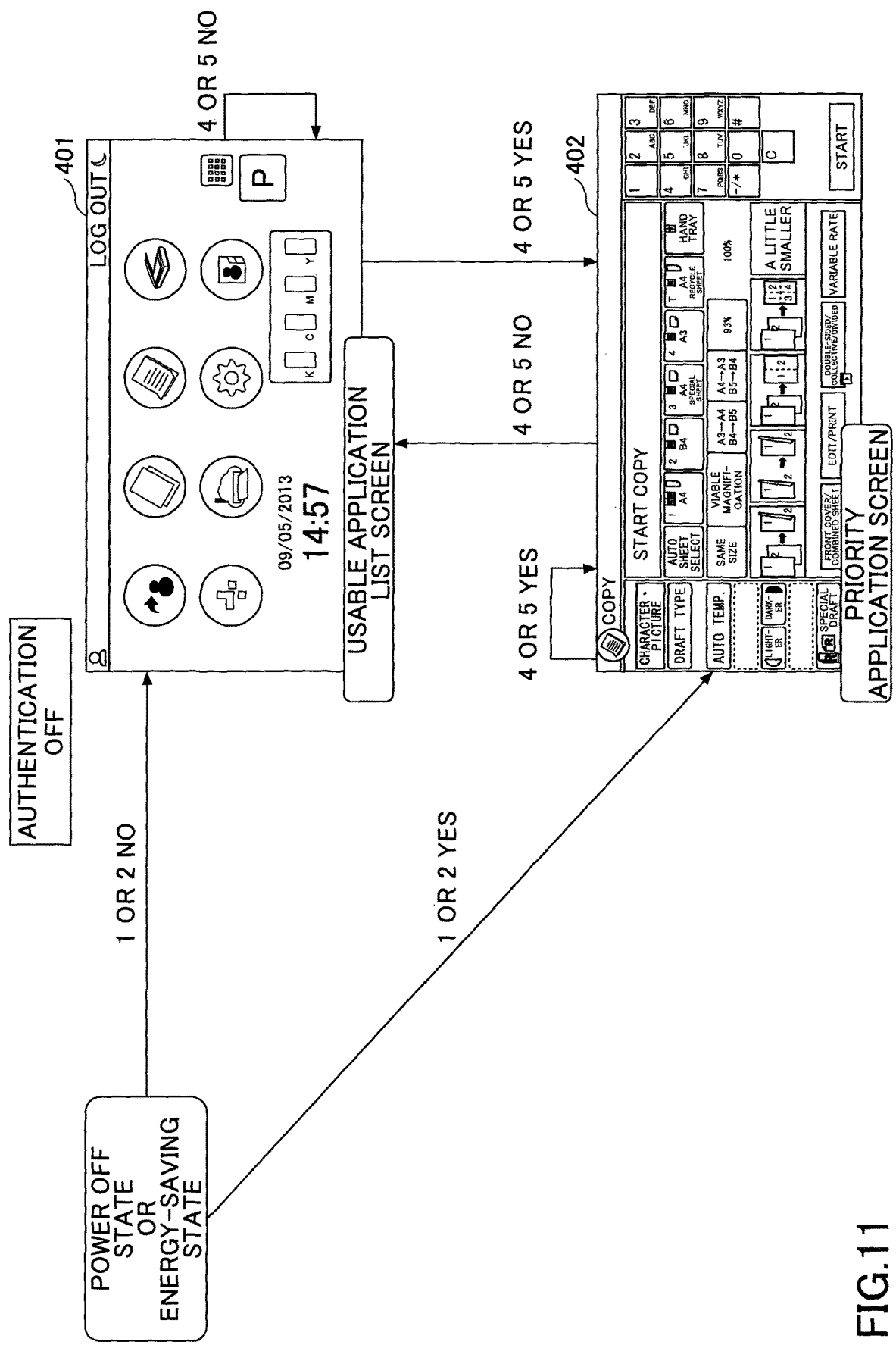
FIG. 11 is a drawing illustrating an example transition of screens when authentication is OFF.
Figure 12:
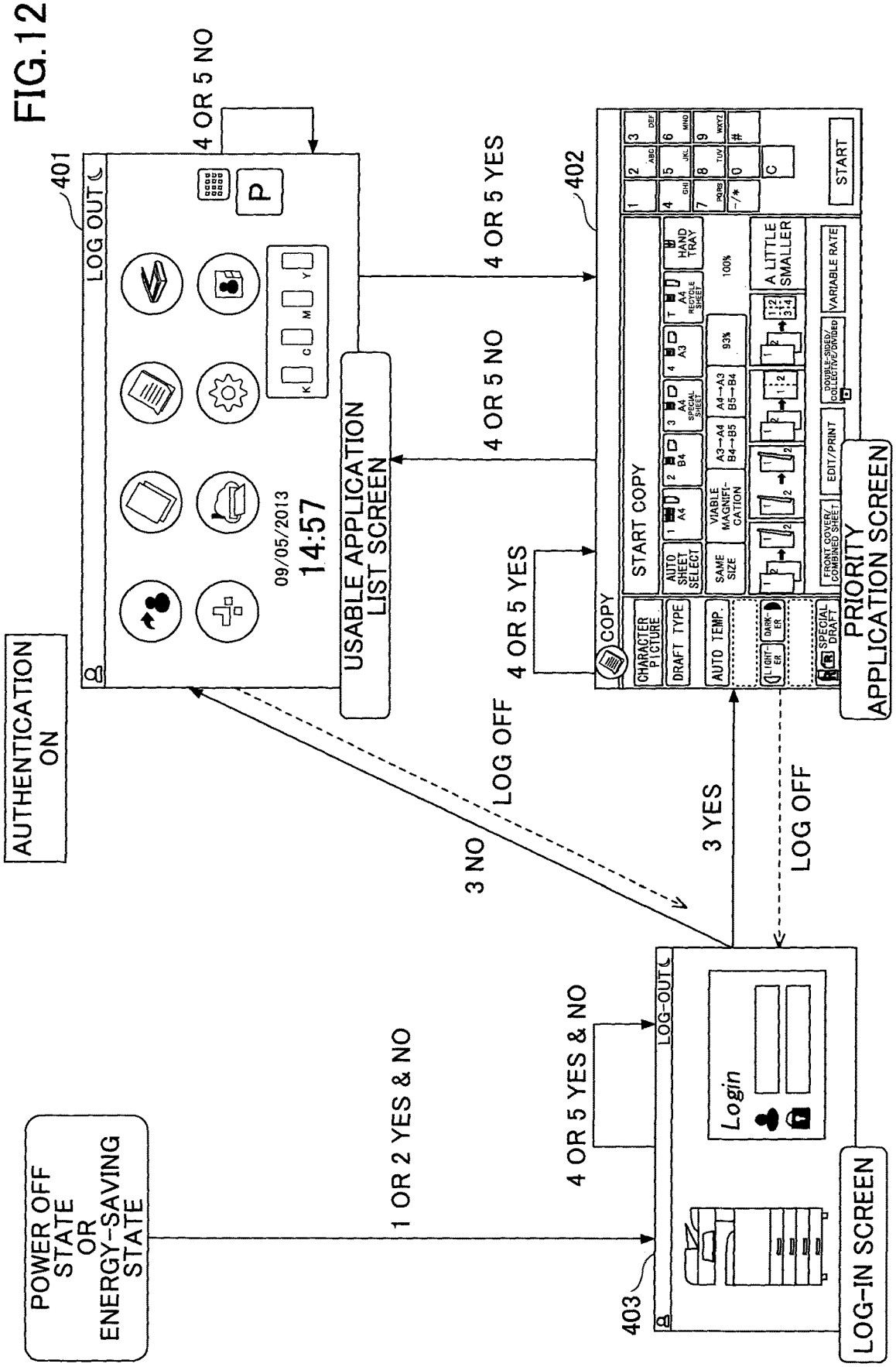

Next, with reference to FIGS. 11 and 12, examples of screen transition displayed on the display 27 are described. FIG. 11 illustrates an example screen transition in case of "Authentication OFF", and FIG. 12 illustrates an example screen transition in case of "Authentication ON".

The arrow indicates the transition from the screen (or the state) before the transition to the screen of the transition destination. Further, the number illustrated near the arrow denotes the number of the event. The transition destination differs depending on whether "Yes" or "No" is set in the priority application start-up target event definition file. Therefore, two arrows are illustrated (started) from one screen (or state).

The example transition of FIG. 11 is in the case of "Authentication OFF". In this case, the screen transitions from the power off state or the energy saving state to the usable application list screen 401 or the priority application screen 402. Further, the screen transitions from the usable application list screen 401 to either the usable application list screen 401 continuously or the priority application screen 402. Further, the screen transitions from the priority application screen 402 to either the priority application screen 402 continuously or the usable application list screen 401.

The example transition of FIG. 12 is in the case of "Authentication ON". In this case, the screen transitions from the power off state or the energy saving state to the log-in screen 403. Further, the screen transitions from the log-in screen 403 to one of continuing the log-in screen 403, the usable application list screen 401, and the priority application screen 402.

Further, the screen transitions from the usable application list screen 401 or the priority application screen 402 to the transition destinations of FIG. 11 or the log-in screen 403 by logging off. Namely, the log-off is one type of the events, but transition destinations are unchanged.

In the following, details are described of the screen transition from the screens (or states) as the starting points. Here, the description of the screen transition from the power off state or the energy saving state in the case of "Authentication OFF", which is described above with reference to FIG. 1, is omitted.

FIGS. 13A and 13B illustrate example transitions from the usable application list screen 401. In the example transitions, the transition destinations are common regardless of whether the case is "Authentication ON" or "Authentication OFF". In FIG. 13A, "No" is set to the event "System auto reset" in the priority application start-up target event definition file. Due to this, when the event "System auto reset" occurs, the priority application display control section 50 continuously displays the usable application list screen 401.

In FIG. 13B, "Yes" is set to the event "System auto reset" in the priority application start-up target event definition file. Due to this, when the event "System auto reset" occurs, the priority application display control section 50 displays the priority application screen 402.

FIGS. 14A and 14B illustrates example transitions from the usable application list screen 401. In the example transitions, the transition destinations are common regardless of whether the case is "Authentication ON" or "Authentication OFF". In FIG. 14A, "No" is set, to the event "Home key press-down" in the priority application start-up target event definition file. Due to this, when the event "Home key press-down" occurs, the priority application display control section 50 continuously displays the usable application list screen 401.

In FIG. 14B, "Yes" is set to the event "Home key press-down" in the priority application start-up target event definition file. Due to this, when the event "Home key press-down" occurs, the priority application display control section 50 displays the priority application screen 402.

Figure 15A:
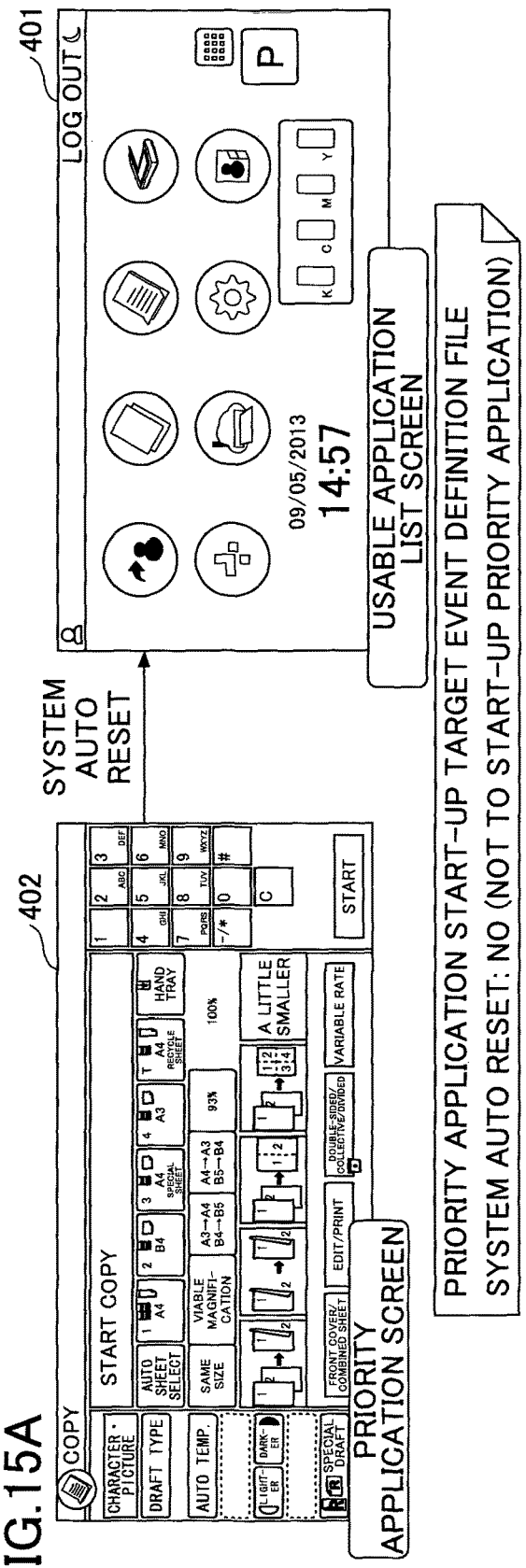
FIGS. 15A and 15B are drawings illustrating example transitions from a priority application screen.
Figure 15B:
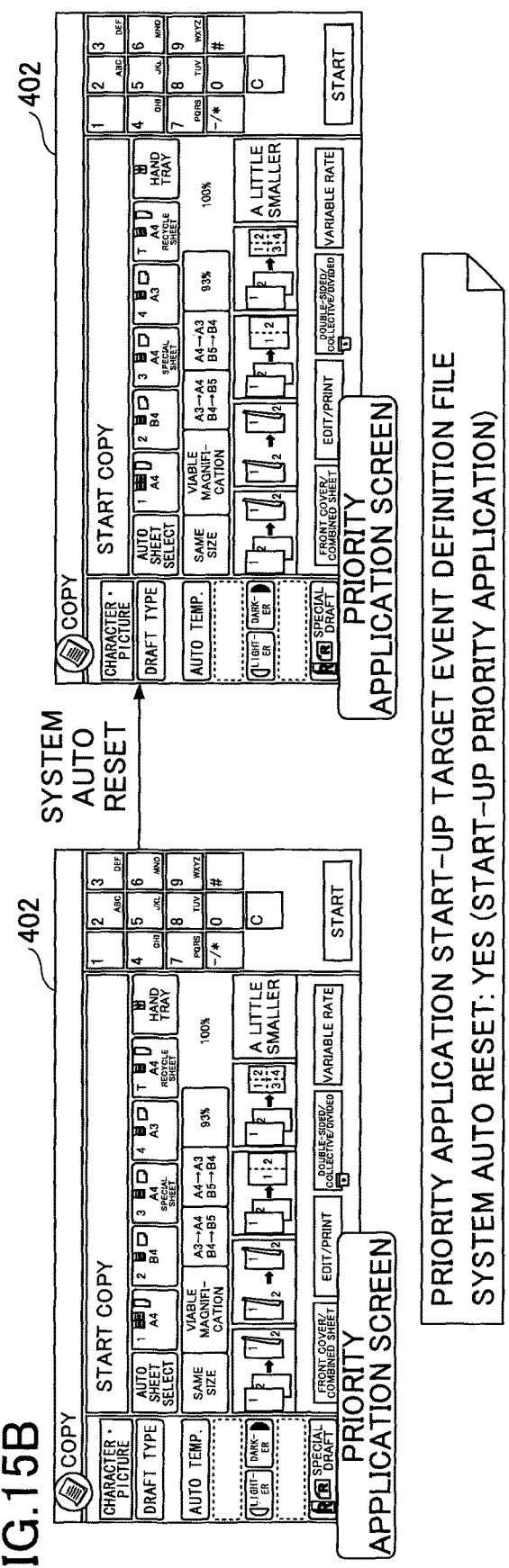

FIGS. 15A and 15B illustrate example transitions from the priority application screen 402. In the example transitions, the transition destinations are common regardless of whether the case is "Authentication ON" or "Authentication OFF". In FIG. 15A, "No" is set to the event "System auto reset" in the priority application start-up target event definition file. Due to this, when the event "System auto reset" occurs, the priority application display control section 50 displays the usable application list screen 401.

In FIG. 15B, "Yes" is set to the event "System auto reset" in the priority application start-up target event definition file. Due to this, when the event "System auto reset" occurs, the priority application display control section 50 continuously displays the priority application screen 402.

Figure 16A:
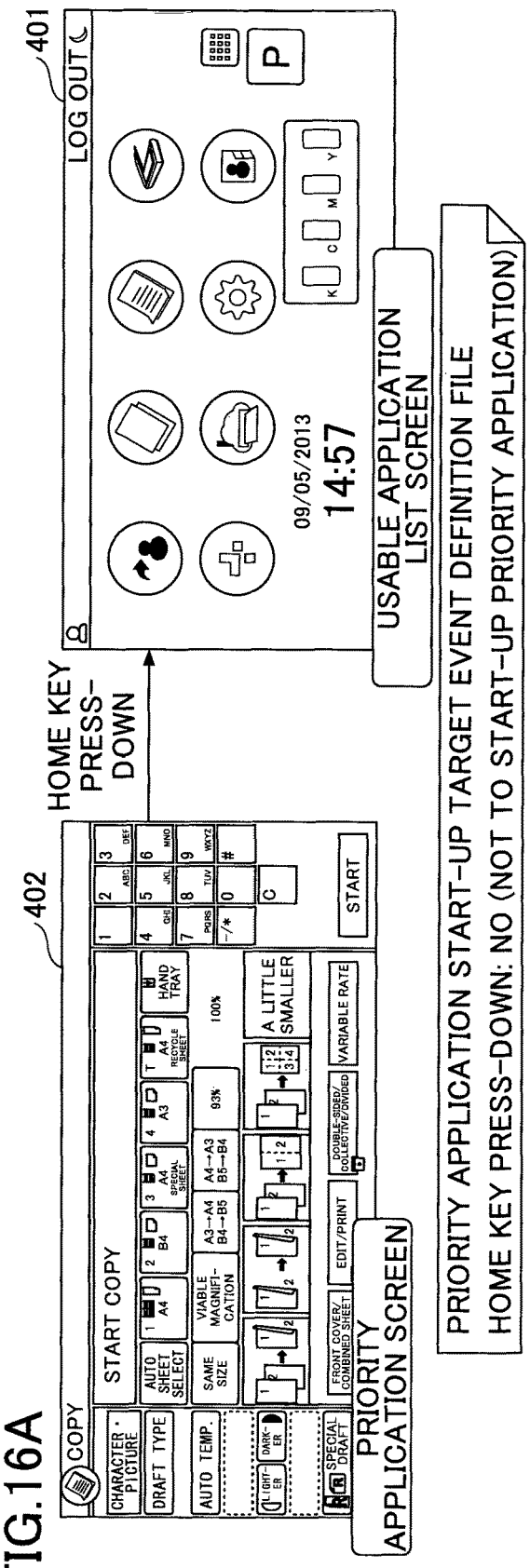
FIGS. 16A and 16B are other drawings illustrating example transitions from the priority application screen.
Figure 16B:
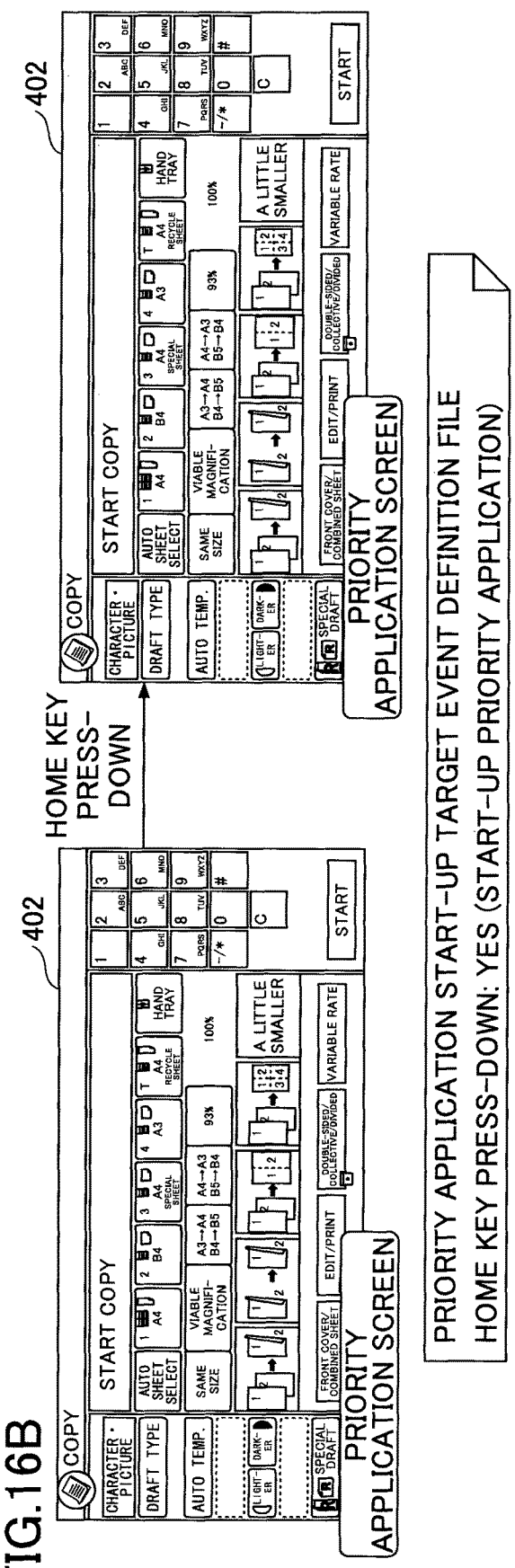

FIGS. 16A and 16B illustrate example transitions from the priority application screen 402. In the example transitions, the transition destinations are common regardless of whether the case is "Authentication ON" or "Authentication OFF". In FIG. 16A, "No" is set to the event "Home key press-down" in the priority application start-up target event definition file. Due to this, when the event "Home key press-down" occurs, the priority application display control section 50 displays the usable application list screen 401.

In FIG. 16B, "Yes" is set to the event "Home key press-down" in the priority application start-up target event definition file. Due to this, when the event "Home key press-down" occurs, the priority application display control section 50 continuously displays the priority application screen 402.

Figure 17A:
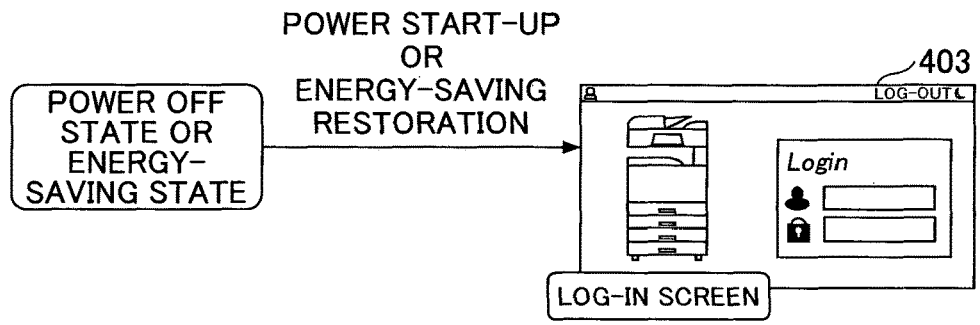
FIGS. 17A through 17C are drawings illustrating example transitions from a login screen.
Figure 17B:
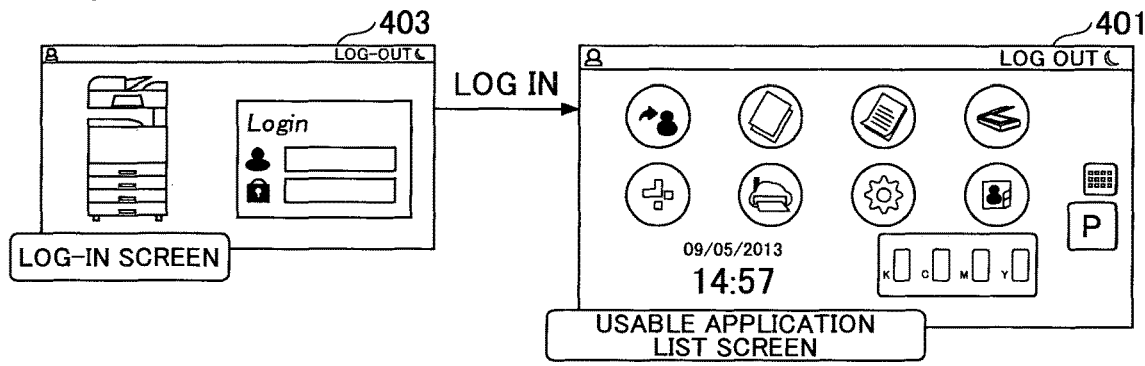
Figure 17C:
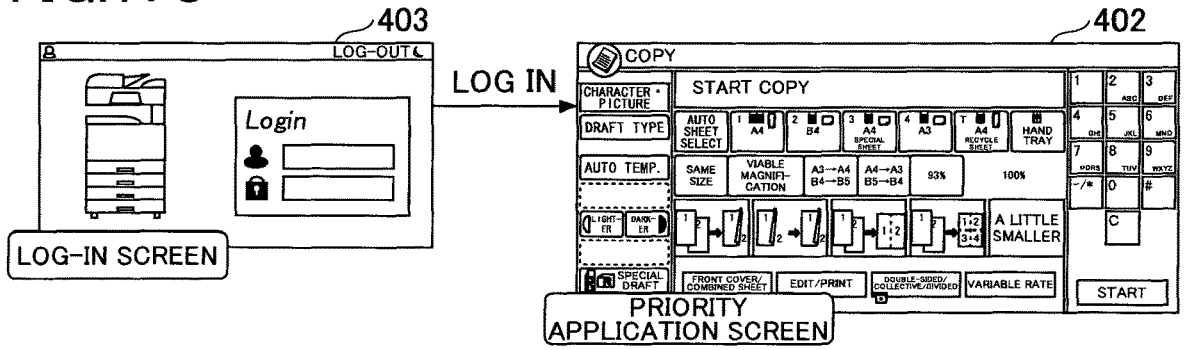

FIGS. 17A through 17C illustrate example transitions related to the log-in screen. Those transitions occur only in the case "Authentication ON". First, as illustrated in FIG. 17A, when the event "power start-up" or "energy-saving restoration" occurs, the screen transitions from the power off state or the energy saving state to the log-in screen 403.

In FIG. 17B, "No" is set to the event "Log-in" in the priority application start-up target event definition file. Due to this, when the event "Log-in" occurs, the priority application display control section 50 displays the usable application list screen 401.

In FIG. 17C, "Yes" is set to the event "Log-in" in the priority application start-up target event definition file. Due to this, when the event "Log-in" occurs, the priority application display control section 50 displays the priority application screen 402.

Figure 18A:
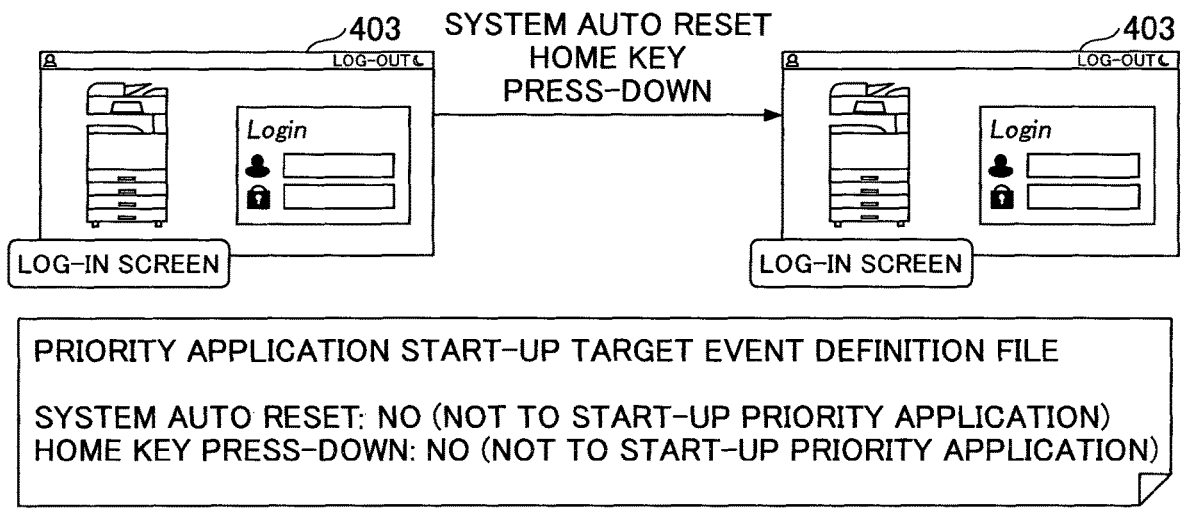
FIGS. 18A and 18B are other drawings illustrating example transitions from the login screen.
Figure 18B:
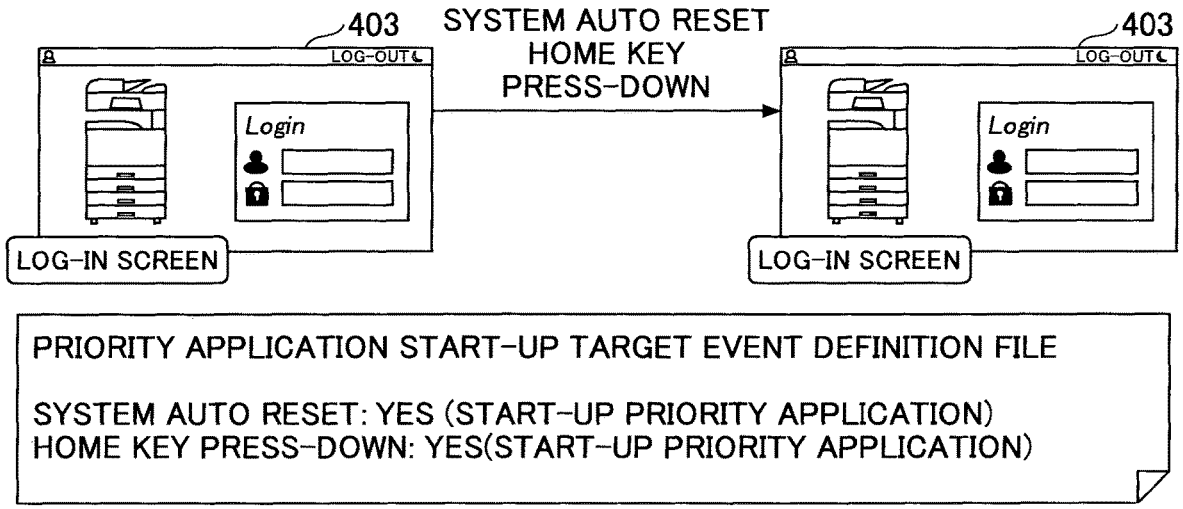

FIGS. 18A and 18B illustrate example transitions from the log-in screen 403. In FIG. 18A, "No" is set to the event "System auto reset" or "Home key press-down" in the priority application start-up target event definition file. In FIG. 18B, "Yes" is set to the event "System auto reset" or "Home key press-down" in the priority application start-up target event definition file.

However, when the event "Log-in" occurs, the log-in screen 403 should not be transitioned to any of the priority application screen 402 and the usable application list screen 401. Therefore, in any of the cases of FIGS. 18A and 18B, the priority application display control section 50 continuously displays the log-in screen 403.

As described above, the MultiFuction Peripheral 100 according to this embodiment can display the list of usable applications or the initial screen of the priority application in accordance with the having-occurred event. Therefore, it becomes possible to display the screen which is desired by a user in accordance with the use of the user.

Operation Procedure

Figure 19:
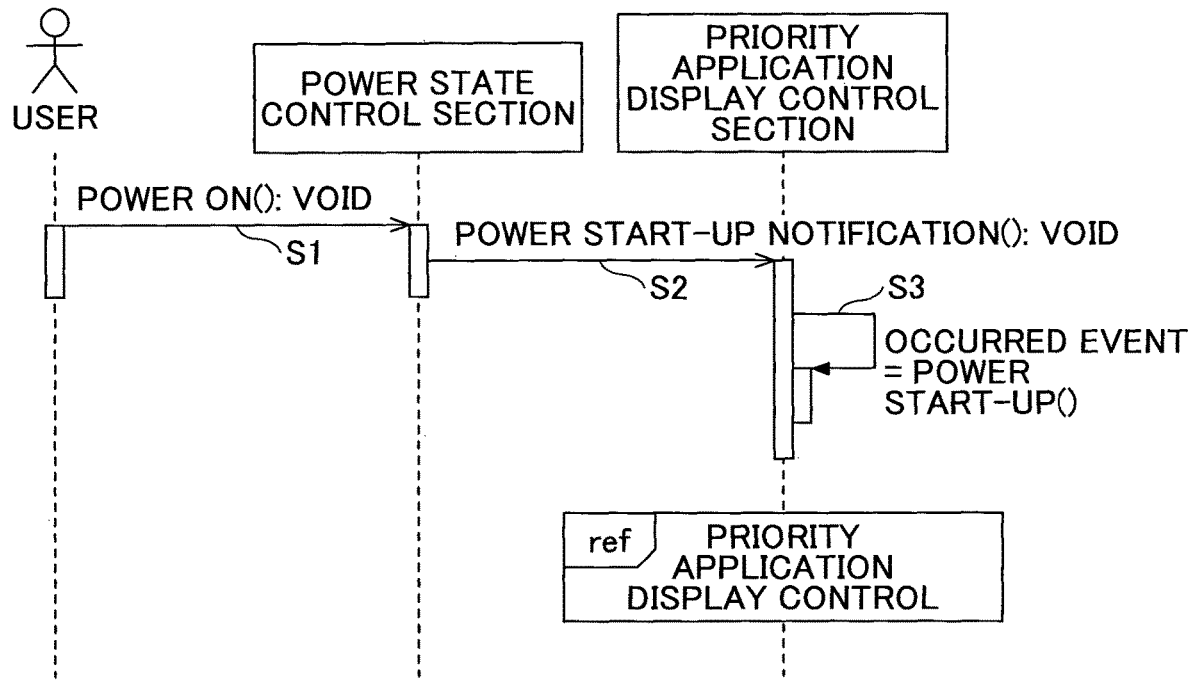
FIG. 19 is a drawing illustrating an example procedure when power of the information processing terminal is started up.

FIG. 19 is a sequence diagram of an example operation procedure of the information processing terminal 80 when power starts up.

S1: When a user turns ON the main power of the MultiFuction Peripheral 100, the power state control section 43 detects the power ON. Specifically, the information processing terminal 80 may detect the power ON via the communication path 300 or by receiving a command indicating the power ON from the main-body apparatus 90. In the figure, the term "void" denotes that there is no return value of the method. However, there may exist a return value.

S2: The power state control section 43 outputs a power start-up notification to the priority application display control section 50.

S3: The priority application display control section 50 determines that the having-occurred event is the "Power start-up", and performs priority application display control. The priority application display control is described with reference to FIG. 24.

Figure 20:
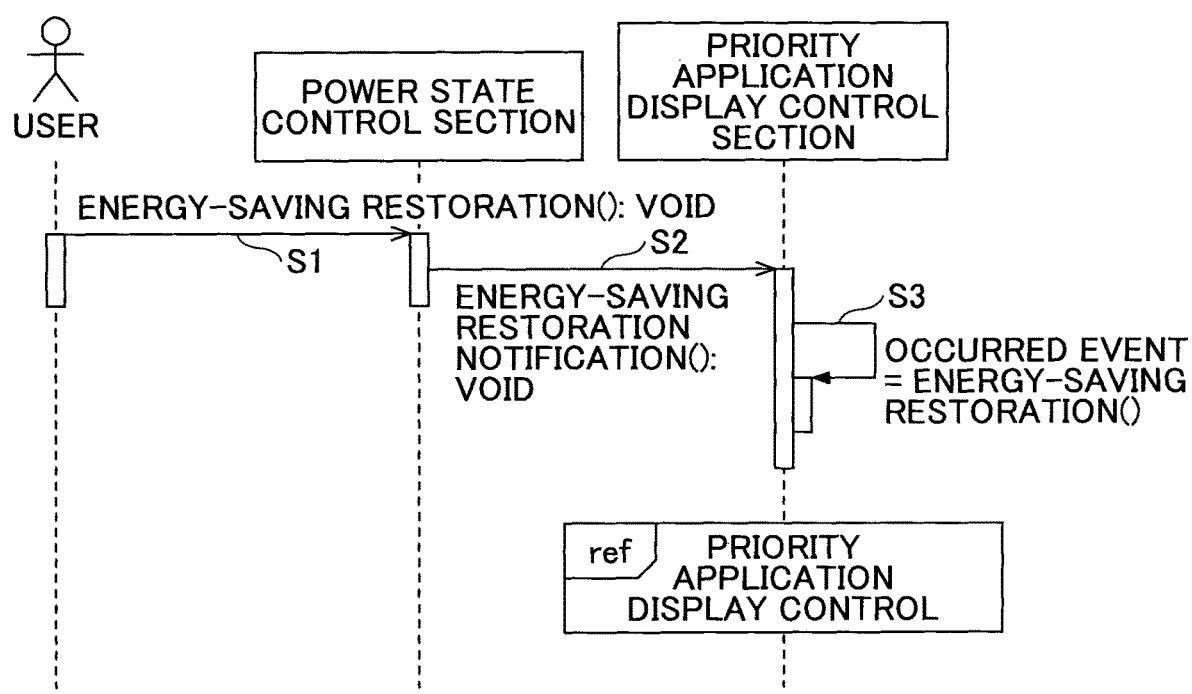
FIG. 20 is a drawing illustrating an example procedure when the information processing terminal is recovered to be in an energy-saving state.

FIG. 20 is a sequence diagram of an example operation procedure of the information processing terminal 80 when restored to energy saving.

S1: By a user's operation, reception of print data, or the like, the state of the MultiFuction Peripheral 100 is restored to the energy-saving state, so that the MultiFuction Peripheral 100 detects the energy-saving state. Specifically, the information processing terminal 80 may detect the restoration to the energy-saving state by the restart of power supply via the communication path 300, or by receiving a command indicating the restoration to the energy-saving state from the main-body apparatus 90.

S2: The power state control section 43 outputs an energy-saving restoration notification to the priority application display control section 50.

S3: The priority application display control section 50 determines that the having-occurred event is the "energy-saving restoration", and performs the priority application display control. The priority application display control is described with reference to FIG. 24.

Figure 21:
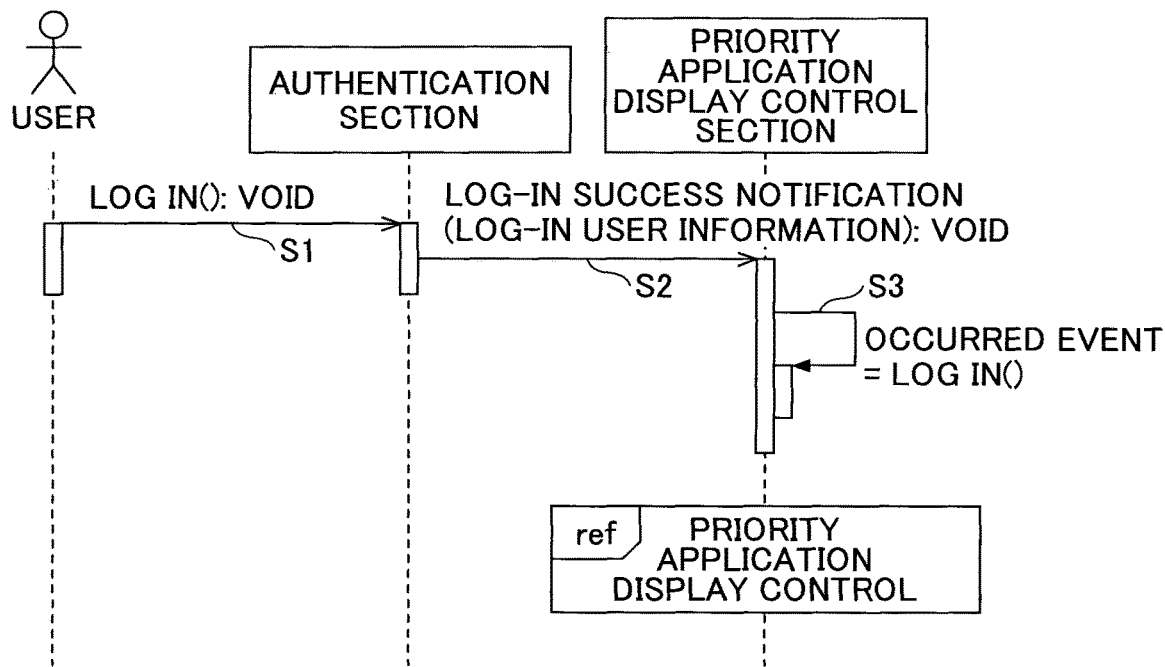

FIG. 21 is a sequence diagram of an example operation procedure of the information processing terminal 80 when a user logs in.

S1: When a user performs a log-in operation on the log-in screen 403, the authentication section 44 determines whether the user authentication is successful.

S2: When it is determined that the user authentication is successful, the authentication section 44 outputs a log-in success notification along with the user information of the log-in user as argument to the power state control section 43. The user information of the log-in user is acquired from the user information storage section 60.

S3: The priority application display control section 50 determines that the having-occurred event is the "log-in", and performs the priority application display control. The priority application display control is described with reference to FIG. 24.

Figure 22:
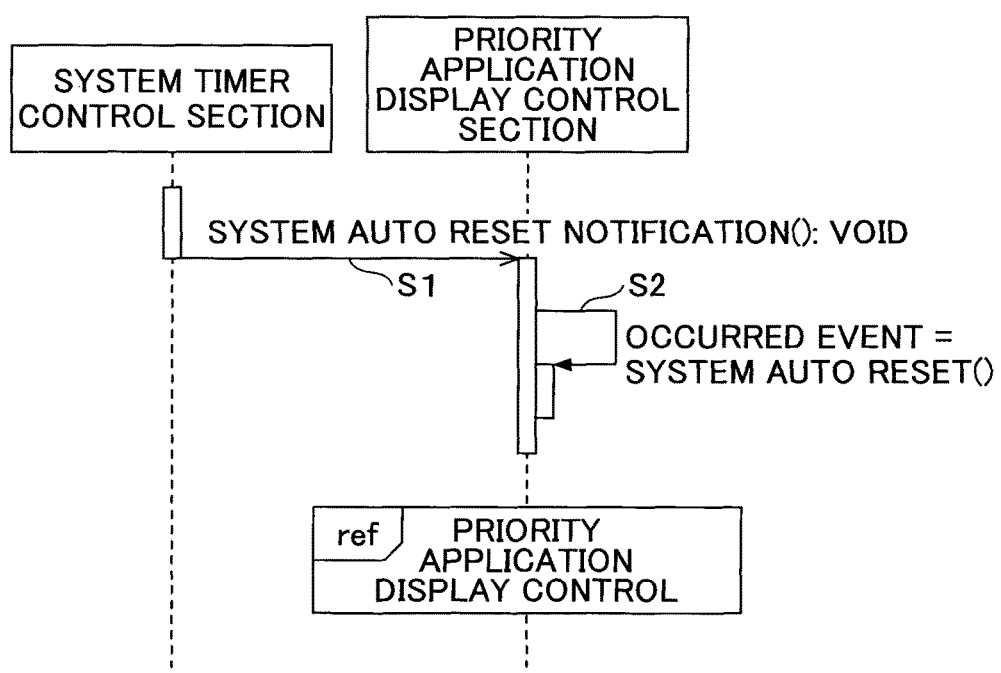
FIG. 22 is a drawing illustrating an example procedure of the information processing terminal in system auto reset.

FIG. 22 is a sequence diagram of an example operation procedure of the information processing terminal 80 in the System auto reset.

S1: When a timer overflows, the system timer control section 45 detects that no operation has been performed for a predetermined time period, and outputs a system auto reset notification to the priority application display control section 50.

S2: The priority application display control section 50 determines that the having-occurred event is the "System auto reset", and performs the priority application display control. The priority application display control is described with reference to FIG. 24.

Figure 23:
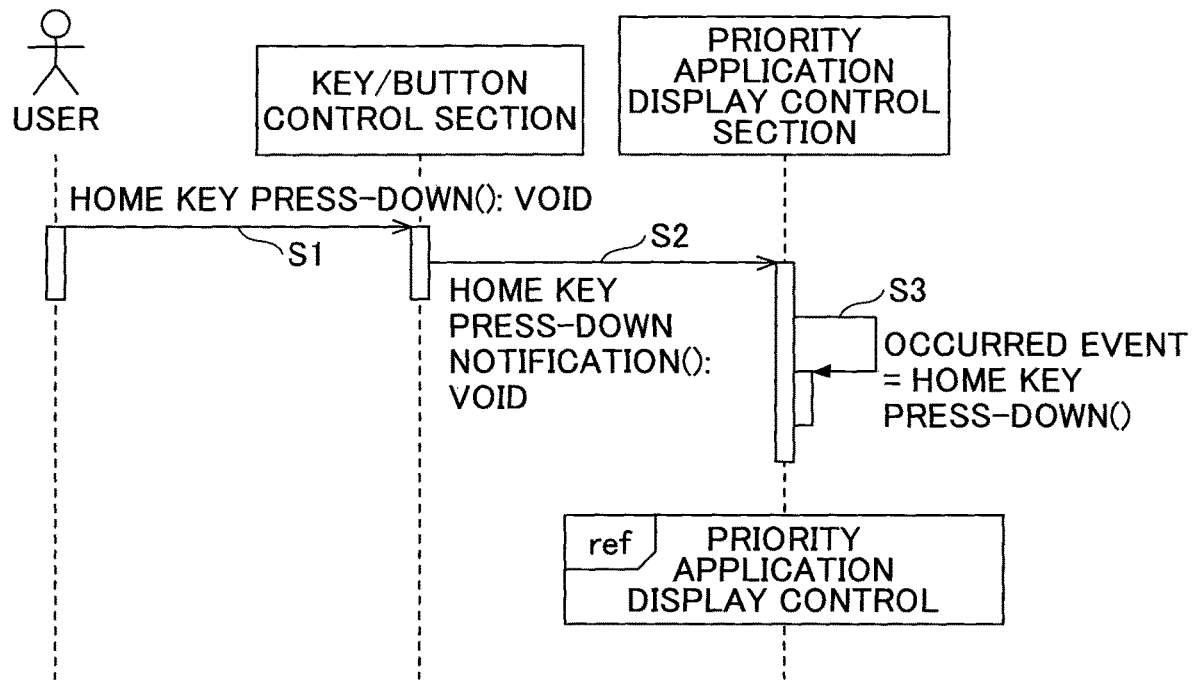
FIG. 23 is a drawing illustrating an example procedure of the information processing terminal when a home key is pressed.

FIG. 23 is a sequence diagram of an example operation procedure of the information processing terminal 80 when the home key is pressed down.

S1: When the home key is pressed down, the key/button control section 46 detects that the home key is pressed down.

S2: The key/button control section 46 outputs a home key pressed-down notification to the priority application display control section 50.

S3: The priority application display control section 50 determines that the occurred event is the "Home key press-down", and performs the priority application display control. The priority application display control is described with reference to FIG. 24.

Figure 24:
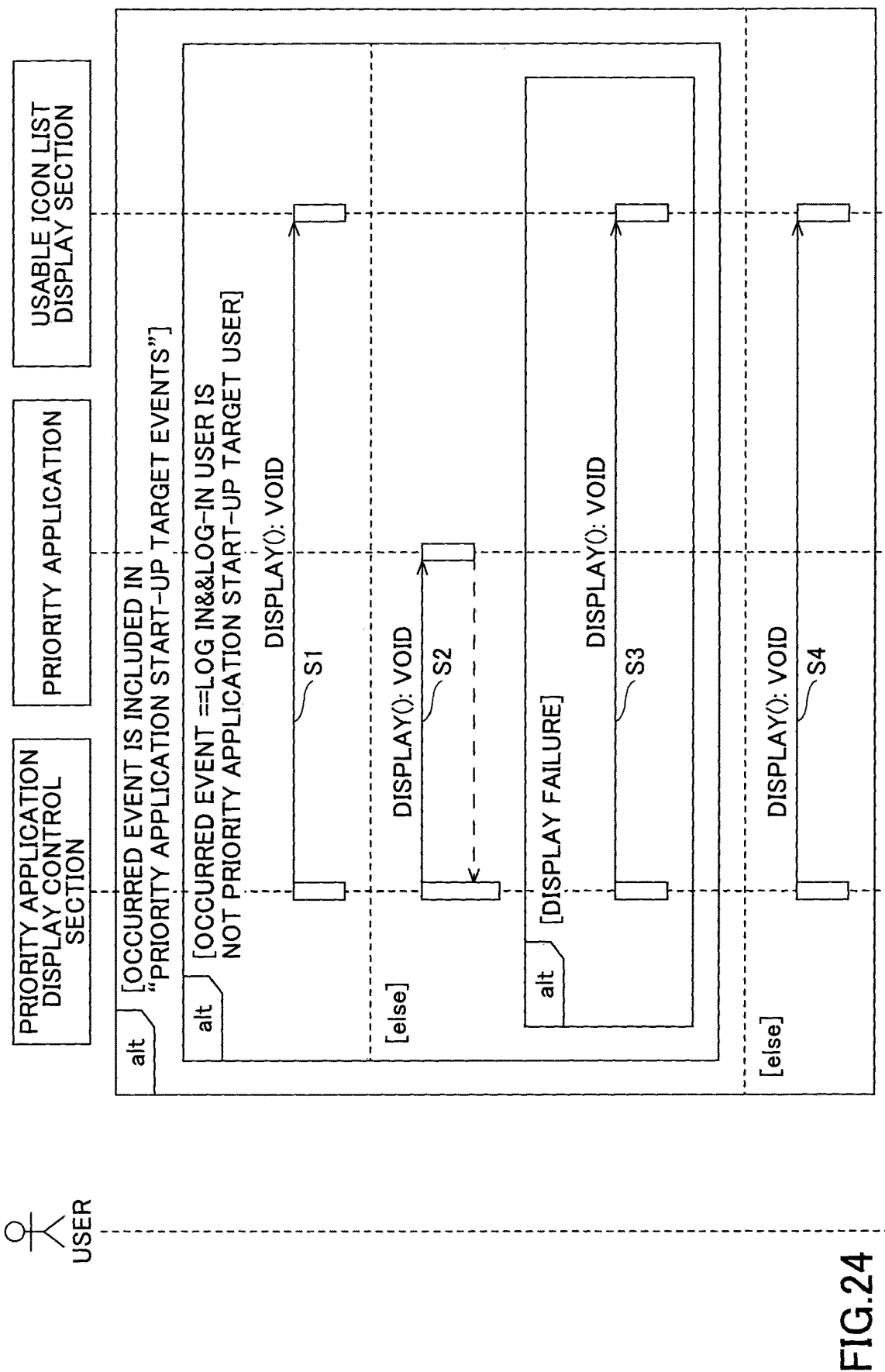
FIG. 24 is a drawing illustrating an example procedure when a priority application display control section performs application display control.

FIG. 24 is a sequence diagram of an example procedure of the priority application display control performed by the priority application display control section 50. There are two cases where the priority application is the legacy application 32 and the priority application is the application 41. However, in (step S2 of) FIG. 24, the case is described where the priority application is the application 41 of the information processing terminal 80.

The process of FIG. 24 is divided two cases: a case where the having-occurred event is included in priority application start-up target events (steps S1 through S3) and a case where the having-occurred event is not included in the priority application start-up target events (step S4).

S1: The priority application display control section 50 determines whether the having-occurred event is a priority application start-up target event by referring to the priority application start-up target event definition file. When determining that the having-occurred event is a priority application start-up target event, the priority application display control section 50 further determines whether the occurred even is the "Log-in" and the log-in user is included in priority application start-up target users by referring to the priority application start-up target user definition file. When determining that the having-occurred even is the "Log-in" and the log-in user is not a priority application start-up target user, the priority application display control section 50 sends a request for display to the usable icon list display section 52.

S2: When the condition of S1 is not satisfied (i.e., when the having-occurred event is not "Log-in" or when the log-in user is included in the priority application start-up target users), the priority application display control section 50 causes the priority application to display. The priority application displays the initial screen of the application 41.

S3: If the priority application fails to display, the priority application display control section 50 sends a request for display to the usable icon list display section 52. Although the display failure of the priority application occurs in a state where the priority application cannot be used, it is possible to avoid the screen transition to that screen. If the screen is transitioned to that screen, an additional step becomes necessary for a user to switch from that screen to the usable application list screen. In this embodiment, screen is switched to the usable application list screen in advance, it becomes possible to remove this additional step.

S4: When the having-occurred event is not registered in the priority application start-up target event definition file, the priority application display control section 50 sends a request to the usable icon list display section 52 to display the usable application list screen 401. The usable icon list display section 52 displays the usable application list screen 401.

Figure 25:
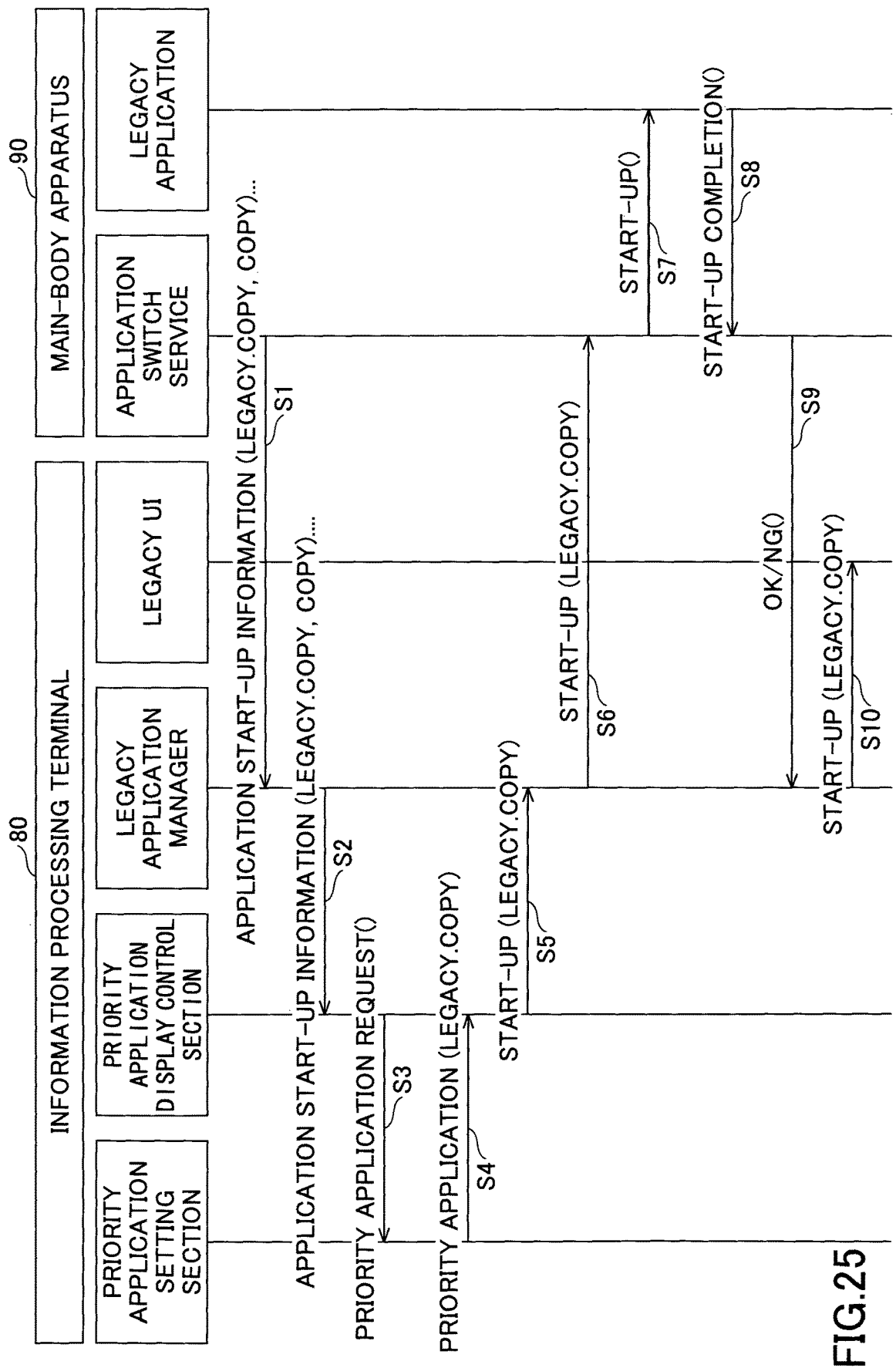
FIG. 25 is a drawing illustrating an example display procedure of the priority application when the priority application is a legacy application in FIG. 24.

FIG. 25 illustrates an example procedure of displaying the priority application in the case where the priority application is the legacy application 32.

S1: When main power of the MultiFuction Peripheral 100 is turned ON, the application switch service 36 transmits an application start-up notification to the legacy application manager 47. The application start-up notification refers to the information including the application name and the icon of the legacy application 32 that can be started up by the main-body apparatus 90. By doing this, it becomes possible to detect the legacy application 32 that can be started up by the main-body apparatus 90.

S2: The legacy application manager 47 reports application start-up information to the priority application display control section 50. The application start-up information refers to the information including the application name and the icon of the legacy application 32 that can be started up by the main-body apparatus 90. Due to this process, as described with reference to FIG. 8, it becomes possible for the priority application setting section 53 to receive the setting of the priority application.

S3: After that, as described with reference to FIG. 24, it is the timing when the priority application display control section 50 displays the priority application. Then, the priority application display control section 50 sends an inquiry to the priority application setting section 53 about the priority application.

S4: The priority application display control section 50 acquires the information (e.g., application name, etc.) of the priority application. In this case, the priority application display control section 50 determines whether the priority application is the legacy application 32 or the application 41 based on the application name and the identification information which is stored in the priority application information storage section 531.

S5: In the case where the priority application is the legacy application 32, the priority application display control section 50 designates the legacy application 32 and sends a request to the legacy application manager 47 to start up the designated legacy application 32.

S6: The legacy application manager 47 designates the legacy application 32 and sends a request to the application switch service 36 of the main-body apparatus 90 to start up the designated legacy application 32.

S7: The application switch service 36 starts up the designated legacy application 32. By starting up the legacy application 32, it becomes possible to determine whether the main-body apparatus 90 can start up the legacy application 32.

S8: When the legacy application 32 has been started up, the application switch service 36 detects start-up completion.

S9: When the legacy application 32 has been started up, the application switch service 36 sends "start-up OK" to the legacy application manager 47. When the legacy application 32 cannot be started up, the application switch service 36 sends "start-up NG" to the legacy application manager 47.

S10: When the legacy application 32 has been started up, the legacy application manager 47 designates the legacy application 32 and sends a request to the legacy UI 48 to start up the designated legacy application 32.

By doing this, the legacy UI 48 generates the screen of the legacy application 32. Therefore, it becomes possible for the screen display framework 51 to display the initial screen of the legacy application 32 on the display 27. Installation of the priority application display control section 50

Next, the installation of the priority application display control section 50 is described. The information processing terminal 80 according to this embodiment can add an application (e.g., a display program), which provides a function of the priority application display control section 50, by installation after the shipment of the MultiFuction Peripheral 100. The function which is added in a manner as described above may be called "add-on" or "plug-in".

Before the priority application display control section 50 is installed, the default of the application display control section 57 is operated. The default of the application display control section 57 does not perform display control of the screen using the priority application start-up target event definition file. Therefore, the default of the application display control section 57 fixes and displays, for example, the usable application list screen 401 or the initial screen of the application 41.

Figure 26:
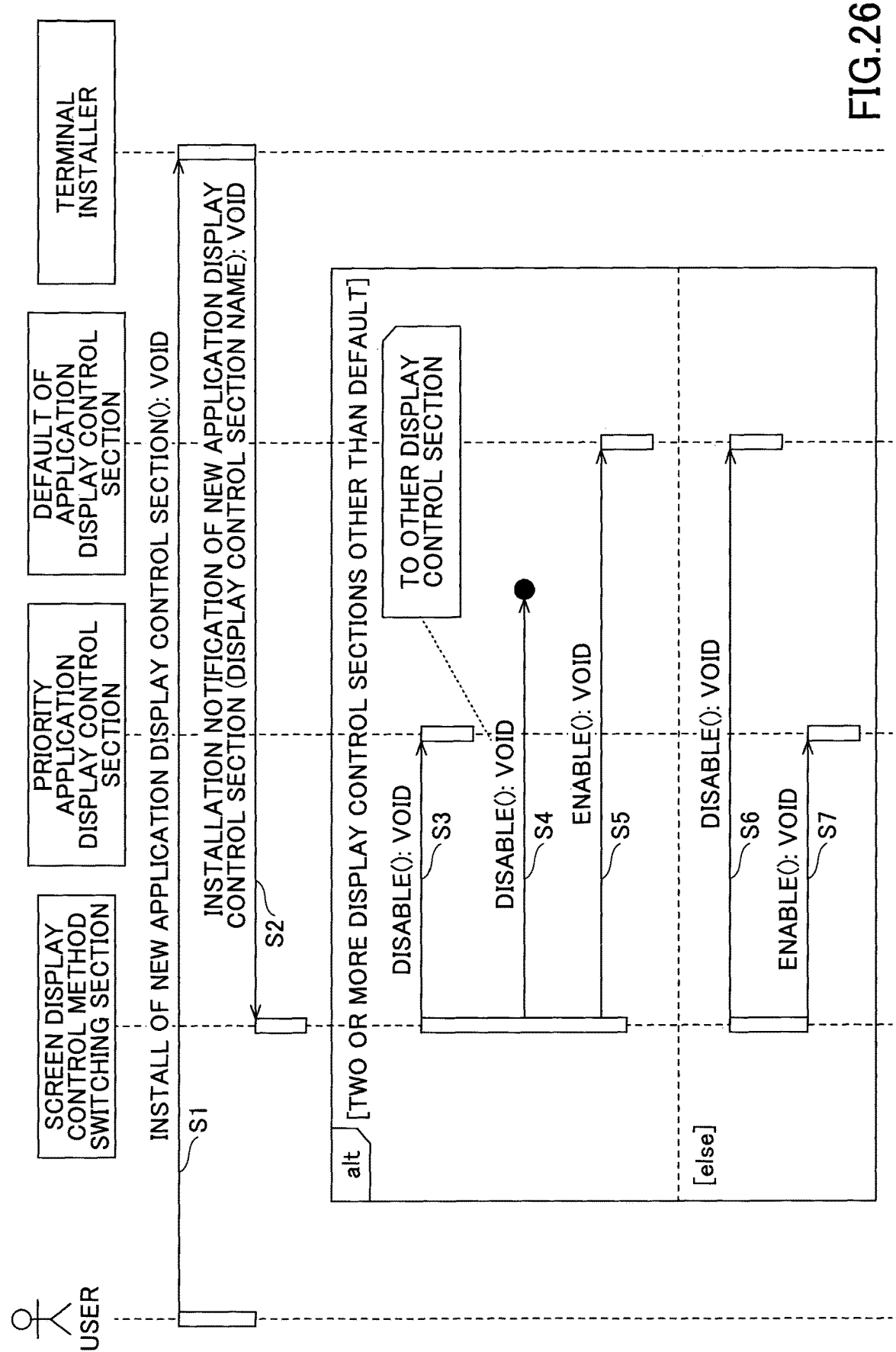
FIG. 26 is an example sequence diagram of the installation procedure of the priority application display control section.

FIG. 26 is a sequence diagram of an example installation procedure of the priority application display control section 50.

S1: A user performs an operation to newly install the priority application display control section 50.

S2: The terminal installer 56 installs the priority application display control section 50, and notifies the screen display control method switching section 55 that the priority application display control section 50 has been installed. In the notification, the application name (name indicating the priority application display control section 50), etc., are also reported.

The screen display control method switching section 55 stores the added application name, and determines the number of the applications which are called "display control section" in the system. Originally, the default of the application display control section 57 is included. Therefore, when the installed priority application display control section 50 is added, there exist two or more "display control sections".

S3, S4: When there exist two or more "display control sections" other than the default, there exists two or more priority application display control sections 50. Therefore, the screen display control method switching section 55 disables the "display control sections" other than the default in the system. The term "disable" refers to the setting so as not to be started up even when the information processing terminal 80 starts up.

S5: Then, the screen display control method switching section 55 enables the default of the application display control section 57. The term "enable" refers to setting the target application which is to be started up when the information processing terminal 80 starts up.

When there exist two or more priority application display control sections 50, those display control sections may be simultaneously started up, so that complicated screen transition may occur. However, by disabling those display control sections, such inconvenience can be prevented.

S6: When there does not exist two or more display control sections other than the default, there exists only one priority application display control section 50. In this case, the screen display control method switching section 55 disables the default of the application display control section 57.

S7: Then, screen display control method switching section 55 enables the priority application display control section 50.

As described above, it is possible to install the priority application display control section 50 according to this embodiment after the shipment. Further, when two or more priority application display control sections 50 are installed, it is possible to disable those, so that complicated screen transition can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

The present application is based on and claims the benefit of priority of Japanese Patent Application No. 2014-130066 filed Jun. 25, 2014, the entire contents of which are hereby incorporated herein by reference.

DESCRIPTION OF THE REFERENCE NUMERALS

31: SDK APPLICATION
32: LEGACY APPLICATION
33: SDK PLATFORM
35, 42: OS
36: APPLICATION SWITCH SERVICE
37: MFP-SIDE COMMUNICATION SECTION
38: MAIN-BODY INSTALLER
41: APPLICATION
43: POWER STATE CONTROL SECTION
44: AUTHENTICATION SECTION
45: SYSTEM TIMER CONTROL SECTION
46: KEY/BUTTON CONTROL SECTION
47: LEGACY APPLICATION MANAGER
48: LEGACY UI
49: OPERATION SECTION-SIDE COMMUNICATION SECTION
51: SCREEN DISPLAY FRAMEWORK
52: USABLE ICON LIST DISPLAY SECTION
53: PRIORITY APPLICATION SETTING SECTION
54: DEFINITION FILE REGISTRATION SECTION
55: SCREEN DISPLAY CONTROL METHOD SWITCHING SECTION
56: TERMINAL INSTALLER
57: DEFAULT OF APPLICATION DISPLAY CONTROL SECTION
58: PRIORITY APPLICATION START-UP TARGET EVENT DEFINITION FILE STORAGE UNIT
59: PRIORITY APPLICATION START-UP TARGET USER DEFINITION FILE STORAGE UNIT
60: USER INFORMATION STORAGE SECTION
80: INFORMATION PROCESSING TERMINAL
90: MAIN-BODY APPARATUS
100: MULTIFUNCTION PERIPHERAL

PRIOR ART DOCUMENTS

Patent Document

[Patent Document 1] Japanese Laid-open Patent Publication No. 2011-151806

The invention claimed is:

1. An information processing apparatus comprising:
a processor that detects at least one event;
that registers corresponding information which associates the event with a program; and
a first display module that displays a screen generated by the program associated with the detected event in the corresponding information,
wherein the first display module:
(i) if the detected event is registered in the corresponding information, displays a first screen generated by the program associated with the detected event in the corresponding information; and
(ii) if the detected event is not registered in the corresponding information, displays a second screen that is different from the first screen and is generated by the processor,
wherein the processor registers definition information which associates a type of a user with information indicating which of the first screen or the second screen is to be displayed, and
wherein the processor acquires a type of a log-in user and controls the first display module if the detected event is registered in the corresponding information, such that the first screen is displayed upon detecting that the acquired type is a first user type, and the second screen is displayed upon detecting that the acquired type is a second user type wherein, in a case in which authentication is required and the type of the log-in user is the first user type, the first display module displays the first screen if the detected event is registered in the corresponding information, and the first display module displays the second screen if the detected event is not registered in the corresponding information, and wherein, in a case in which the authentication is not required, the first display module displays the first screen if the detected event is registered in the corresponding information, and the first display module displays the second screen if the detected event is not registered in the corresponding information, without considering the type of the user.

2. The information processing apparatus according to claim 1, wherein the processor generates a user interface of an apparatus program which is installed in an apparatus that is connected to the information processing apparatus, wherein the first display module displays the user interface of the apparatus program, which is generated by the processor, as the screen in the form of the first screen when the event, which is detected by the processor, is registered in the corresponding information.

3. The information processing apparatus according to claim 2, wherein the processor acquires information of the apparatus program which is installed in the apparatus that is connected to the information processing apparatus, and wherein the processor receives a setting of the program from among a program which is installed in the information processing apparatus and the apparatus program which is acquired by the processor.

4. The information processing apparatus according to claim 3, wherein, in a case where the program, which generates the screen in the form of the first screen that is determined to be displayed by the first display module, is the apparatus program which is installed in the apparatus that is connected to the information processing apparatus, the first display module sends a request to the processor to start up the apparatus program which is received by the processor, and generates the user interface of the apparatus program when the processor sends a request to the apparatus to start up the apparatus program and the apparatus program starts up.

5. The information processing apparatus according to claim 3, wherein the processor generates the screen in the form of the second screen which displays a list of display parts that start up the apparatus program, which is installed in the apparatus connected to the information processing apparatus and which is acquired by the processor, and the program installed in the information processing apparatus, and wherein the first display module displays the screen in the form of the second screen, when the event, which is detected by the processor, is not registered in the corresponding information.

6. The information processing apparatus according to claim 1, further comprising:

a second display module, wherein the processor detects that a display program is installed in the information processing apparatus; and wherein the processor switches display control from the second display module to the first display module which is realized by the installed display program when receiving a report, which indicates that the display program is installed, from the processor.

7. The information processing apparatus according to claim 6, wherein in a case where there are a plurality of first display modules, the processor disables the plurality of first display modules and enables the second display module.

8. The information processing apparatus according to claim 1, wherein the corresponding information registers at least one of "Power start-up", "Restore to energy saving", "Log-in", "System auto reset", and "Home key press-down" as an event by which the first display module displays the screen in the form of the first screen, and wherein the first display module displays the screen in the form of the first screen, when the processor detects any one of "Power start-up", "Restore to energy saving", "Log-in", "System auto reset", and "Home key press-down".

9. The information processing apparatus according to claim 8, wherein the first display module continuously displays the screen in the form of the first screen, when the processor detects an event which is registered in the corresponding information while the screen in the form of the first screen is displayed, and wherein the first display module switches the screen from the screen in the form of the second screen to the screen in the form of the first screen, when the processor detects an event which is registered in the corresponding information while the screen in the form of the second screen is displayed.

10. The information processing apparatus according to claim 8, wherein the first display module displays the screen in the form of the first screen when the processor detects an event which is registered in the corresponding information while the first display module does not display a screen, and wherein the first display module displays the screen in the form of the second screen when the processor detects an event which is not registered in the corresponding information while the first display module does not display a screen.

11. The information processing apparatus according to claim 8, wherein the first display module displays the screen in the form of the first screen when the processor detects an event which is registered in the corresponding information while the first display module displays a log-in screen, and wherein the first display module displays the screen in the form of the second screen when the processor detects an event which is not registered in the corresponding information while the first display module displays the log-in screen.

12. The information processing apparatus according to claim 1, wherein the type of a user is information indicating any one of a general user, a guest user, and a manager.

13. An information processing method comprising:
    detecting at least one event;
    registering corresponding information which associates the event with a program;
    displaying a screen generated by the program associated with the detected event in the corresponding information;
    (i) if the detected event is registered in the corresponding information, displaying a first screen generated by the program associated with the detected event in the corresponding information;
    (ii) if the detected event is not registered in the corresponding information, displaying a second screen that is different from the first screen;
    registering definition information which associates a type of a user with information indicating which of the first screen or the second screen is to be displayed;
    acquiring a type of a log-in user; and
    controlling the first display module if the detected event is registered in the corresponding information, such that the first screen is displayed upon detecting that the acquired type is a first user type, and the second screen is displayed upon detecting that the acquired type is a second user type
    wherein, in a case in which authentication is required and the type of the log-in user is the first user type, the first display module displays the first screen if the detected event is registered in the corresponding information, and the first display module displays the second screen if the detected event is not registered in the corresponding information, and
    wherein, in a case in which the authentication is not required, the first display module displays the first screen if the detected event is registered in the corresponding information, and the first display module displays the second screen if the detected event is not registered in the corresponding information, without considering the type of the user.

14. A non-transitory computer-readable recording medium that stores a program causing a computer to perform an information processing method comprising:
    detecting at least one event;
    registering corresponding information which associates the event with a program;
    displaying a screen generated by the program associated with the detected event in the corresponding information;
    (i) if the detected event is registered in the corresponding information, displaying a first screen generated by the program associated with the detected event in the corresponding information;
    (ii) if the detected event is not registered in the corresponding information, displaying a second screen that is different from the first screen;
    registering definition information which associates a type of a user with information indicating whether the first screen is to be displayed;
    acquiring a type of a log-in user; and
    controlling the first display module if the detected event is registered in the corresponding information, such that the first screen is displayed upon detecting that the acquired type is a first user type, and the second screen is displayed upon detecting that the acquired type is a second user type
    wherein, in a case in which authentication is required and the type of the log-in user is the first user type, the first display module displays the first screen if the detected event is registered in the corresponding information, and the first display module displays the second screen if the detected event is not registered in the corresponding information, and
    wherein, in a case in which the authentication is not required, the first display module displays the first screen if the detected event is registered in the corresponding information, and the first display module displays the second screen if the detected event is not registered in the corresponding information, without considering the type of the user.

* * * * *